US011406159B2

(12) United States Patent
Paulson et al.

(10) Patent No.: US 11,406,159 B2
(45) Date of Patent: Aug. 9, 2022

(54) METHOD AND APPARATUS FOR MANUFACTURING FOOTWEAR SOLES

(71) Applicant: Saucony, Inc., Waltham, MA (US)

(72) Inventors: Andrea A. Paulson, Arlington, MA (US); Alexander W. Jessiman, Newton, MA (US); Christopher J. Mahoney, Concord, MA (US); J. Spencer White, North Easton, MA (US)

(73) Assignee: Saucony, Inc., Waltham, MA (US)

( * ) Notice: Subject to any disclaimer, the term of this patent is extended or adjusted under 35 U.S.C. 154(b) by 431 days.

(21) Appl. No.: 16/416,586

(22) Filed: May 20, 2019

(65) Prior Publication Data
US 2019/0350308 A1    Nov. 21, 2019

Related U.S. Application Data

(60) Provisional application No. 62/674,304, filed on May 21, 2018.

(51) Int. Cl.
| | | |
|---|---|---|
| *A43B 13/04* | (2006.01) | |
| *A43B 13/18* | (2006.01) | |
| *B29D 35/12* | (2010.01) | |

(52) U.S. Cl.
CPC ............ *A43B 13/04* (2013.01); *A43B 13/187* (2013.01); *B29D 35/122* (2013.01)

(58) Field of Classification Search
CPC .. A43B 13/04; A43B 9/16; A43B 9/18; A43B 13/87; A43B 13/187; B29D 35/122; B29D 35/0054; B29D 35/0065; B29D 35/085; B29D 35/12; B29D 39/04; B29C 39/04; B29C 43/04; B29C 43/461; B29C 2043/425; B29C 44/1219; B29C 45/04; B29C 45/1705; B29C 2045/328; B29C 2049/4807; B29C 49/4815; B29C 51/087; B29C 51/20

See application file for complete search history.

(56) References Cited

U.S. PATENT DOCUMENTS

| | | | |
|---|---|---|---|
| 9,610,746 | B2 | 4/2017 | Wardlaw et al. |
| 9,781,974 | B2 | 10/2017 | Reinhardt et al. |
| 9,788,598 | B2 | 10/2017 | Reinhardt et al. |
| 9,788,606 | B2 | 10/2017 | Reinhardt et al. |
| 9,795,186 | B2 | 10/2017 | Reinhardt et al. |
| 2013/0291409 | A1 | 11/2013 | Reinhardt et al. |

(Continued)

FOREIGN PATENT DOCUMENTS

| | | |
|---|---|---|
| EP | 2 786 670 | 10/2014 |
| TW | I605925 | 11/2017 |

OTHER PUBLICATIONS

The International Search Report and Written Opinion of the International Searching Authority for International Application No. PCT/US2019/0033201 dated Aug. 22, 2019.

*Primary Examiner* — Stella K Yi
(74) *Attorney, Agent, or Firm* — Warner Norcross + Judd LLP

(57) ABSTRACT

A system and method for molding a component within a molding system having a mold cavity that includes at least one controlled compression region associated with and adjacent to a movable mold part. In one embodiment, the mold cavity may include a reference compression region for which the movable mold part is configured to substantially avoid affecting or to substantially act independently, or both.

10 Claims, 15 Drawing Sheets

(56) References Cited

U.S. PATENT DOCUMENTS

| | | |
|---|---|---|
| 2014/0223673 A1 | 8/2014 | Wardlaw et al. |
| 2014/0366403 A1 | 12/2014 | Reinhardt et al. |
| 2014/0366404 A1 | 12/2014 | Reinhardt et al. |
| 2014/0366405 A1 | 12/2014 | Reinhardt et al. |
| 2016/0007676 A1 | 1/2016 | Leimer et al. |
| 2016/0128426 A1 | 5/2016 | Reinhardt et al. |
| 2017/0173910 A1 | 6/2017 | Wardlaw et al. |
| 2018/0035755 A1 | 2/2018 | Reinhardt et al. |
| 2018/0055144 A1 | 3/2018 | Bischoff |
| 2018/0319048 A1 | 11/2018 | Huang et al. |
| 2019/0126580 A1 | 5/2019 | Paulson et al. |

METHOD AND APPARATUS FOR MANUFACTURING FOOTWEAR SOLES

FIELD OF THE INVENTION

The present application relates to a method and apparatus for manufacturing footwear sole components using expanded foam beads.

BACKGROUND

Many conventional components made from expanded bead foams are manufactured by filling a mold cavity with expanded beads. In these conventional components, the expanded beads come from a hopper through a mold injection port. The beads are then fused together by heating the beads in a process known as steam chest molding. The beads are filled into the molds with a gap in the mold such that the beads are pressed subsequent to filling to attempt to eliminate voids and improve filling. The mold gap may be several millimeters greater than the desired net shaped finished part would be. In other words, the volume space for the expanded beads during insertion is greater than the desired final volume. The mold gap is then closed to the final shape and steam is inserted into the mold to fuse the beads and further expand them. In manufacture of conventional components, the mold gap is closed the same amount in the direction the mold is closed.

For certain geometries, for example a footwear midsole, there may be differences in thickness in different portions of the part. In many shoes the differences in thickness between the midfoot and forefoot may be anywhere between 0 mm and 12 mm, and sometimes more. However, in conventional steam chest molding, the mold gap is fixed even if the final part is shallower in the forefoot than in the heel. Thus, percentage-wise, the forefoot may be compressed more than the heel. For example, assume a desired final part where the forefoot was 15 mm thick and the heel was 25 mm thick and a mold gap of 10 mm, the forefoot would get compressed by 10 mm/(10 mm+15 mm) or 40% and the heel would be compressed by 10 mm/(10 mm+25 mm)=29%. This means the forefoot is compressed more and has a higher density, or a footwear midsole having non-uniform density for a shoe with an offset.

SUMMARY

A system and method for molding a component within a molding system having a mold cavity that includes at least one controlled compression region associated with and adjacent to a movable mold part. In one embodiment, a reference compression region may be provided in the mold cavity for which the movable mold part is configured to substantially avoid affecting. In one embodiment, a reference compression region may be provided in the mold cavity for which the movable mold part is configured to substantially act independently.

In one embodiment, a molding system is provided for manufacturing a sole component from foam beads. The molding system may include at least three mold parts adapted to cooperatively define a mold cavity shaped to correspond to a shape of the sole component. The at least two mold parts may be configured to reposition from a bead loading position to a bead joining position, wherein the at least two mold parts define the mold cavity in the bead joining position.

The at least two mold parts may include a movable mold part, a first mold part, and a second mold part. The movable mold part, the first mold part, and the second mold part may be adapted to define at least a portion of the mold cavity. The movable mold part may be movable automatically relative to the first mold part from a biased position to an unbiased position, the movable mold part being in the biased position in the bead loading position of the at least three mold parts, and where the movable mold part may be movable to the unbiased position to align with the first mold part in the bead joining position.

As an example, the movable mold part may include a movable surface, where, in the unbiased position, the movable surface is aligned with a first surface of the first mold part to cooperatively define a first surface portion of the mold cavity, and where in the biased position, the movable surface and the first surface provide a discontinuity in the first surface portion.

In one embodiment, a method of manufacturing a footwear sole is provided. The method includes providing a mold cavity defined at least by a first mold part, a second mold part, and a movable mold part, and positioning the first mold part opposite the second mold part at a loading position to define a first region of the mold cavity. The method may also include biasing the movable mold part to a bias position opposite the second mold part to define a second region of the mold cavity, and loading the mold cavity by introducing foam beads into the first and second regions of the mold cavity.

A first region volume of the first region may be reduced to a first value by disposing the second mold part and the first mold part to an intermediate position. A second region volume of the second region may be reduced by disposing the second mold part and the movable mold part to the intermediate position. The method may include automatically displacing the movable mold part relative to the first mold part in response to reducing the first region volume from the first value to a second value. As an example, automatically displacing the movable mold part may include maintaining the second region volume.

In one embodiment, a method for manufacturing a sole component for an article of footwear is provided. The method includes providing a mold cavity defined at least by a first mold part, a second mold part, and a movable mold part, and positioning the first mold part opposite the second mold part at a loading position to define a first region of the mold cavity.

The movable mold part may be biased to a bias position opposite the second mold part to define a second region of the mold cavity.

The mold cavity may be loaded by introducing foam beads into the first and second regions of the mold cavity. A first region volume of the first region may be reduced, and a second region volume of the second region may be reduced. Reduction in the volumes may be achieved by disposing the second mold part, the first mold part, and the movable mold part to an intermediate position.

The method may include further reducing the first region volume while maintaining the second region volume by automatically displacing the movable mold part relative to the first mold part. The method may also include positioning the first mold part, the second mold part, and the movable mold part in a joining position.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION

A system and method for molding a component within a molding system having a mold cavity that includes at least one controlled compression region associated with and adjacent to a movable mold part, and a reference compression region for which the movable mold part is configured to substantially avoid affecting.

I. Footwear

Figure 1:
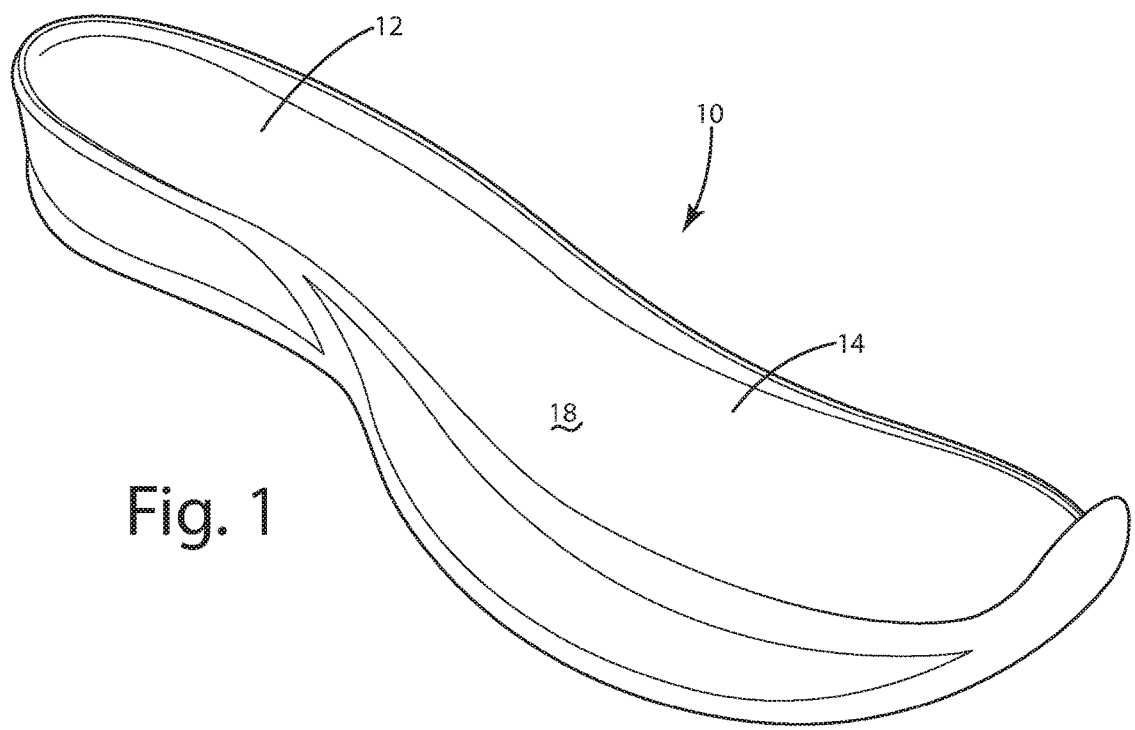
FIG. 1 shows a perspective view of a midsole formed using a molding system in accordance with one embodiment.

A sole component 10 manufactured from bead foam in accordance with an embodiment of the present disclosure is shown in FIG. 1. The sole component 10 includes a top surface 18 and is manufactured with a heel portion 12 and a forefoot portion 14 formed from at least one foam bead type. The foam beads may be the same type or may vary in any way, such as variations in size, shape, color, resiliency, durability or other functional or aesthetic characteristics. In one embodiment, there may be more than one region of different types of foam beads. The number, location, arrangement and configuration of regions of different bead types may vary from application to application.

The sole component 10 in the illustrated embodiment may be configured such that the heel portion 12 has a heel thickness greater than (or different from) a forefoot thickness of the forefoot portion 14. This difference in thickness is described herein as the offset of the sole component 10.

If formed of similar foam beads in a two-piece mold, the heel portion 12 and the forefoot portion 14 may be exhibit different densities due at least in part to the offset. The percent compression of the forefoot portion 14 is greater than and unmodifiable with respect to the percent compression of the heel portion 12. A method and system of forming a sole component 10 in accordance with one embodiment may customize the percent compression of one region of the sole component 10 relative to another region of the sole component 10. For instance, the percent compression of the forefoot portion 14 may be selected to be the same as the percent compression of the heel portion 12.

Figure 2:
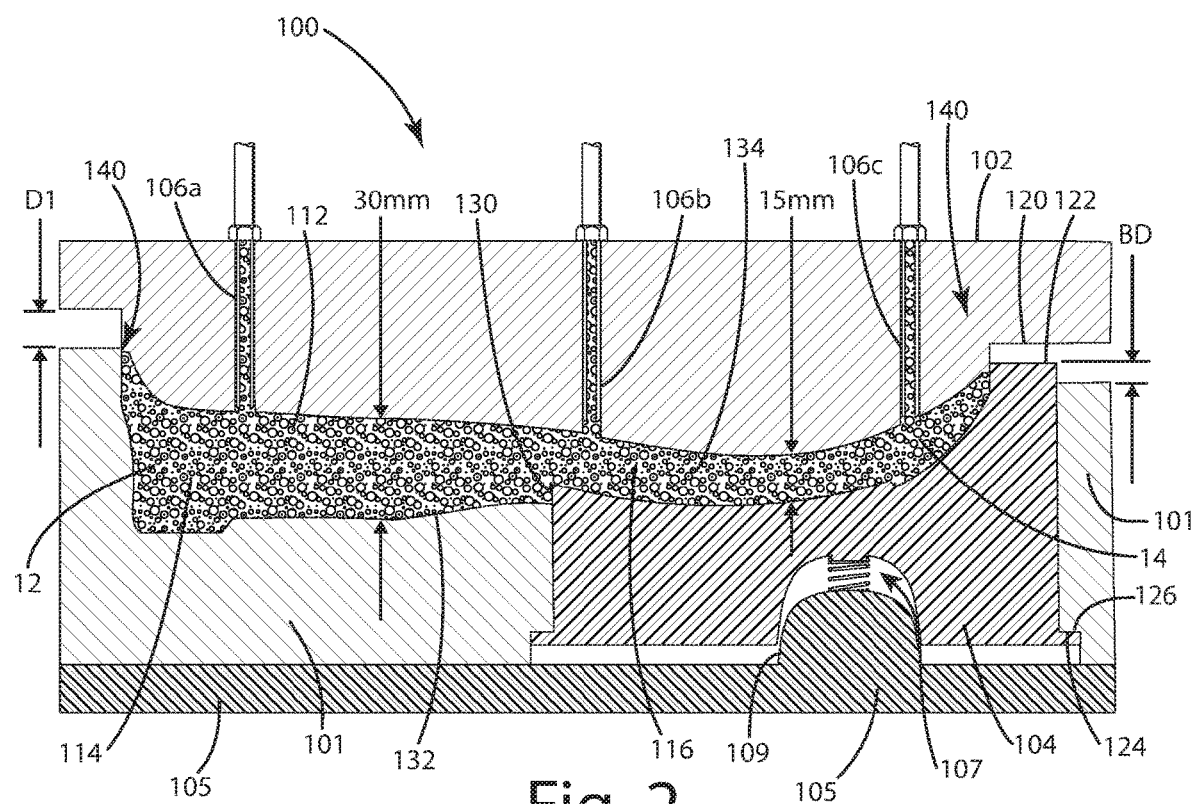
FIG. 2 is a sectional view of a molding system in accordance with one embodiment showing the mold cavity filled with foam beads in a loading position.

The sole component 10 may be manufactured using a variety of molding systems. FIG. 2 is an illustration of one embodiment of a molding system 100 capable of manufacturing the sole component 10. The molding system 100 includes a top mold part 102, a bottom mold part 101, injection ports 106a-c, a movable mold part 104, and a bias element 107. During operation, the movable mold part 104 may move automatically from a biased position to an unbiased position to effectively prevent further compression of a region of the sole component 10 that is adjacent the movable mold part 104, such as the forefoot portion 14 in the illustrated embodiment of FIG. 2.

For purposes of this application, the terms "heel region," "arch region" and "forefoot region" are used to refer to those portions of the sole component 10 that lie generally below the heel, arch and forefoot, respectively, of a typical wearer's foot. Further, directional terms, such as "vertical," "horizontal," "top," "bottom," "upper," "lower," "inner," "inwardly," "outer" and "outwardly," are used to assist in describing one or more embodiments of the present disclosure based on the orientation of the embodiments shown in the illustrations. The use of directional terms should not be interpreted to limit the one or more embodiments to any specific orientation(s).

In one aspect, a sole component 10 in accordance with one embodiment for an article of footwear is manufactured from bead foam. The bead foam may be a bead foam that can be formed into a finished product by forming individual foam beads, loading the individual foam beads into the mold and then joining the foam beads inside the mold. The beads may be partially or fully expanded during manufacturing of the individual foam beads and/or during the process of joining the beads together in the mold. In one embodiment, the foam beads are expanded thermoplastic polyurethane ("eTPU") foam. Specific examples of suitable foams include "180SD" eTPU foam, which is commercially available from Guo Sheng of Chidian Town, Jinjiang City, Fujian Province, China; and "Infinergy™" foam, which is commercially available from BASF Corporation of Florham Park, N.J. Further, suitable bead foams are described in US Publication 2010/0222442 to Prissok et al., which published Sep. 2, 2010; US Publication 2013/0227861 to Prissok et al., which published Sep. 5, 2013; US Publication 2015/0174808 to Rudolph et al., which published Jun. 25, 2015; US Publication 2016/0121524 to Daschlein et al., which published May 5, 2016, all of which are incorporated herein by reference in their entirety.

Components formed of bead foams may be molded via steam chest molding to produce lightweight structures, such as Styrofoam coolers and bike helmets. The foam bead material may be expanded polystyrene, expanded polypropylene, expanded thermoplastic polyurethane (eTPU), expanded thermoplastic polyethylene (eTPE), or expanded polyetherblockamide (PEBA), or a combination thereof.

The different regions of the sole component 10, as discussed herein, may be formed with different percentages of compression. The compression percentage may depend on a variety of factors, including compression distance between loading and joining positions for the bead foam and the amount of bead foam provided during the load stage. As discussed herein, the bead foam may be provided in a mold cavity 112 that defines a shape of the component to be molded (e.g., the sole component 10). A thickest region of the shape or the mold cavity 112 may have a different thickness from a thinnest region of the shape or mold cavity 112, and displacement between the loading position and the joining position may depend in some circumstances on the thickest region of the mold cavity 112. As a result, the greater the difference between the thickest region and the thinnest region, the greater the difference in potential compression percentages for these regions. A movable mold part 104 in one embodiment may be provided in the thinnest region (or any other region) and configured to reduce the displacement between the loading and joining positions for the region adjacent the movable mold part 104 but allow full displacement for other regions, such as the thickest region. This may allow for control over the density of the bead foam in one or more regions of the mold cavity 112. In one embodiment, the movable mold part 104 may be configured to provide substantially the same density for a first region relative to a second region, despite differences in thickness of the first and second regions. An example density for both the first region and the second region (e.g., the heel and the forefoot regions) is 0.26 g/cm^3.

Alternatively, the movable mold part 104 may be configured to provide different densities for the first region relative to the second region, despite differences in the thickness of the first and second regions. For instance, the density of the heel portion 12 may be about 0.26 g/cm^3 and the density of the forefoot portion 14 may be about 0.22 g/cm^3. These densities are merely exemplary and the densities of the heel portion 12 and the forefoot portion 14 may have any values. In some applications, the finished sole component 10 may be provided with a substantially uniform density from toe to heel, including throughout the length and width of the heel and forefoot regions.

Given that common production procedures can have different impact on finished density in different regions of the sole component 10, in one embodiment, beads of different densities may be used in the heel and forefoot regions. An example of such a system and method for utilizing beads of different types (e.g., first and second bead foams) in different regions is described in U.S. Nonprovisional application Ser. No. 15/798,514, entitled METHOD AND APPARATUS FOR MANUFACTURING FOOTWEAR SOLES, filed Oct. 31, 2017, to Paulson et al.—the disclosure of which is incorporated herein by reference in its entirety. Although the first and second bead foams may vary in compression characteristics, such as density or hardness, the bead foam may vary in different ways. For example, the bead foams may vary in size, shape, color, resiliency, durability or other functional or aesthetic characteristics.

In some applications, the general goal may be to provide the finished heel and forefoot regions with different densities. For example, in some applications, the sole component 10 may be provided with a firmer heel portion 12 and a softer forefoot portion 14.

It is noted that although described primarily in conjunction with molding a sole component 10, the present disclosure is not so limited—any type of object may be molded according to the systems and methods herein, including other parts of the footwear as well as objects outside the realm of footwear. In other words, the sole component 10 of FIG. 1 is merely exemplary. One or more embodiments of the present disclosure may be incorporated into any footwear sole component, including without limitation outsoles, insoles and footbeds.

It is also noted that the present disclosure is not limited to a sole component 10 with two zones or regions; more than two regions may be provided in the sole component 10 (or any other type of molded component). The densities for each of the at least two regions may be manipulated or selected in accordance with an embodiment described herein, including providing a controlled compression region. For instance, the density of each region may be determined based on one or more consumer preferences or selection criteria, or a combination thereof. In one example, in the context of a sole component 10, the molding system 100 may be configured to provide the heel portion 12 and the forefoot portion 14 with substantially the same density, and to provide a third region, such as a medial post, with a higher density than adjacent regions of the heel portion 12 and the forefoot portion 14.

II. Molding System

As noted above, a manufacturing method in accordance with one embodiment may be implemented using a molding system 100 having a mold cavity 112 that includes at least one controlled compression region 116 associated with and adjacent to a movable mold part 104, and a reference compression region 114 for which the movable mold part 104 is configured to substantially avoid affecting. In the illustrated embodiment of FIG. 2, the controlled compression region 116 is associated with the forefoot portion 14 and designated 114, and the reference compression region 114 is associated with the heel portion 12 and designated 112. It is noted that the reference compression region 114 is described herein as being compressed relative to the controlled compression region 116—it should be understood that in an alternative embodiment, the reference compression region 114 may form a compression controlled region relative to another region other than the controlled compression region 116. For instance, the reference compression region 114 is associated with another movable mold part that displaces relative to a region of the mold cavity 112.

FIG. 2 is an illustration of the molding system 100 in accordance with one embodiment capable of manufacturing sole component 10 in a manner that controls the compression of the controlled compression region 116 relative to the reference compression region 114 of the mold cavity 112.

In the illustrated embodiment, the molding system 100 includes at least three mold parts, including the top mold part 102, the bottom mold part 101, and the movable mold part 104. The molding system 100 may also include the injection ports 106a-c and a base 105 configured to support at least one of the mold parts and to provide a bias support 109 configured to interface with the bias element 107 to facilitate biasing the movable mold part 104 to the bias position. In the illustrated embodiment of FIG. 4, the movable mold part 104 is disposed in an unbiased position, as described herein, at which a movable mold surface 134 is aligned with a bottom portion surface 132 such that a discontinuity 130 is substantially absent in proximity to the junction between these surfaces.

The top mold part 102 and bottom mold part 101 cooperate to define the mold cavity 112 in the shape of the sole component 10, or other component to be molded. The number and arrangement of mold parts may, however, vary from application to application. It should be noted that the terms "top" and "bottom" are used here with reference to the normal orientation of the sole component 10 being molded by the molding system 100 and not the orientation of the molding system 100 or its mold parts 101, 102, and 104. The terms "top" and "bottom" are not intended to limit the orientation of the molding system 100, the top mold part 102 or the bottom mold part 101. Instead, the molding system 100 may be arranged in any orientation, including a sideways orientation in which the top mold part 102 and bottom mold part 101 are oriented on their sides and are configured to close horizontally rather than upright and configured to close vertically as shown in FIG. 2.

The molding system 100 in the illustrated embodiment of FIG. 2 is shown in a loading position at which the mold cavity 112 is sufficiently defined between the at least three molding parts to accept foam beads via the one or more injection ports 106a-c. More specifically, the at least three molding parts 101, 102, 104 may define a loading seal 140 in the loading position that allows acceptance of the foam beads without substantial loss of the foam beads from the mold cavity 112. From this loading position, the bottom mold part 101 and the top mold part 102 may be displaced by distance D to a joining position, as shown in the illustrated embodiment of FIG. 4. In the illustrated embodiment the distance D is 20 mm.

The movable mold part 104 may be disposed in a bias position such that a movable mold surface 134 is displaced by a bias distance BD relative to a bottom portion surface 132 of the bottom mold part 101, forming a discontinuity 130 defined as a misalignment between movable mold surface 134 and the bottom portion surface 132. The bias distance BD in the illustrated embodiment is a positive bias toward the top mold part 102 which opposes both the movable mold surface 134 and the bottom portion surface 132. The positive bias is presented as the movable mold surface 134 being closer to the top mold part 102 relative to the bottom portion surface 132, and is 5 mm in the illustrated embodiment. It should be understood that a negative bias may be implemented in conjunction with one or more alternative embodiments such that the movable mold surface 134 is farther from the top mold part 102 relative to the bottom portion surface 132. A bias element 107, such as a spring or spring-like element, may bias the movable mold surface 134 and the movable mold part 104 to the bias position. In the illustrated embodiment, if the bias distance BD is reduced to 0, the discontinuity 130 may no longer be present such that there is alignment at the junction between the movable mold surface 134 and the bottom portion surface 132.

In the illustrated embodiment, the movable mold part 104 is positionable into the bias position by the bias element 107 in conjunction with a mold stop defined by contact between a movable mold part stop 124 and a bottom mold part stop 126. The mold stop is not limited to this configuration and may be defined differently in a manner capable of operating in conjunction with the bias element 107 to position the movable mold part 104 in the bias position.

During operation, the top mold part 102 is positioned in the loading position to define the mold cavity 112 at least in conjunction with one of the bottom mold part 101 and the movable mold part 104. The loading seal 140 may be present in this configuration, and foam beads may be provided via the one or more injection ports 106a-c. At this stage, the foam beads provided in the controlled compression region 116 and the reference compression region 114 may be approximately the same density, with the controlled compression region 116 having a first compression controlled volume and the reference compression region 114 having a first compression reference volume. The top mold part 102 and the bottom mold part 101 are separated by distance D at a first value D1 in the loading position relative to the joining position, shown in the illustrated embodiment of FIG. 4 as 10 mm.

As noted herein, the amount and type or types of foam beads provided in the loading position may vary from application to application. To provide an example, a first injection port 106-a may provide a first type of foam bead to the mold cavity 112, and a second injection port 106-c may provide a second type of foam bead to the mold cavity 112. As another example, the pressure of the foam beads provided by the first injection port 106-a may be different from the pressure of the foam beads provided by the second injection port 106-b. In one embodiment, the foam beads for one region may flow into an adjacent region. In such applications, the foam beads may be loaded into one region more quickly (e.g., sooner, at a faster rate or at a higher pressure) so that those beads reach the opening first and therefore dominate the flow into the adjacent region. The timing, rate and/or pressure of foam bead introduction can be varied from application to application.

In the illustrated embodiment, the foam beads are introduced into the mold cavity 112 through the injection ports 106a-c, but they may be introduced using any inlet(s) that allow foam beads to be poured into the mold cavity 112 or introduced under pressure. The number of inlets may vary from application to application. In the illustrated embodiment, there is at least one separate inlet for each type of foam beads provided into the mold cavity 112. Referring again to FIG. 2, the top mold part 102 may include one injection port 106a in communication with the heel region and two injection ports 106b-c in communication with the forefoot region. The use of two injection ports 106b-c may help to improve bead distribution within the forefoot region of the mold cavity 112. However, the number and arrangement of injection ports may vary from application to application and from region to region. For example, the two injections ports 106b-c may be replaced by a single injection port, if desired. Although the injection ports 106a-c are shown integrated into the top mold part 102, they may in alternative embodiments be integrated into other mold parts, such as the bottom mold part 101 or any other mold part that may exist in that embodiment. The size, location and angle of entry of the injection ports 106a-c may be selected to assist in controlling the flow of beads into the mold cavity 112 and through the space joining adjacent mold cavity regions.

After the loading stage, with all or a subset of the foam beads for the sole component 10 loaded into the mold cavity 112, the at least three mold parts may be moved to reduce the volume of the reference compression region 114 and the controlled compression region 116. The distance D between the top mold part 102 and the bottom mold part 101 may be displaced from the first value D1 (e.g., 10 mm) at the loading position to a second value D2 (e.g., 5 mm) at an intermediate position, as depicted in the illustrated embodiment of FIG. 3. In the illustrated embodiment, displacement of the top mold part 102 relative to the movable mold part 104 is also reduced in conjunction with the bottom mold part 101.

Displacement may be effected by movement of one or both of the top mold part 102, the bottom mold part 101, and the movable mold part 104. In the illustrated embodiment, the top mold part 102 is held in a fixed position, and the base 105, which is coupled to the bottom mold part 101 and the movable mold part 104, is moved to close the distance D from the first value D1 to the second value D2. The base 105 may be moved in a variety of ways, including for example a hydraulic actuator (or any type of actuator) coupled to the base 105. Other ways of moving the base 105 or effecting displacement of the at least one mold part 101, 102, 104 are within the scope of the present disclosure.

Figure 3:
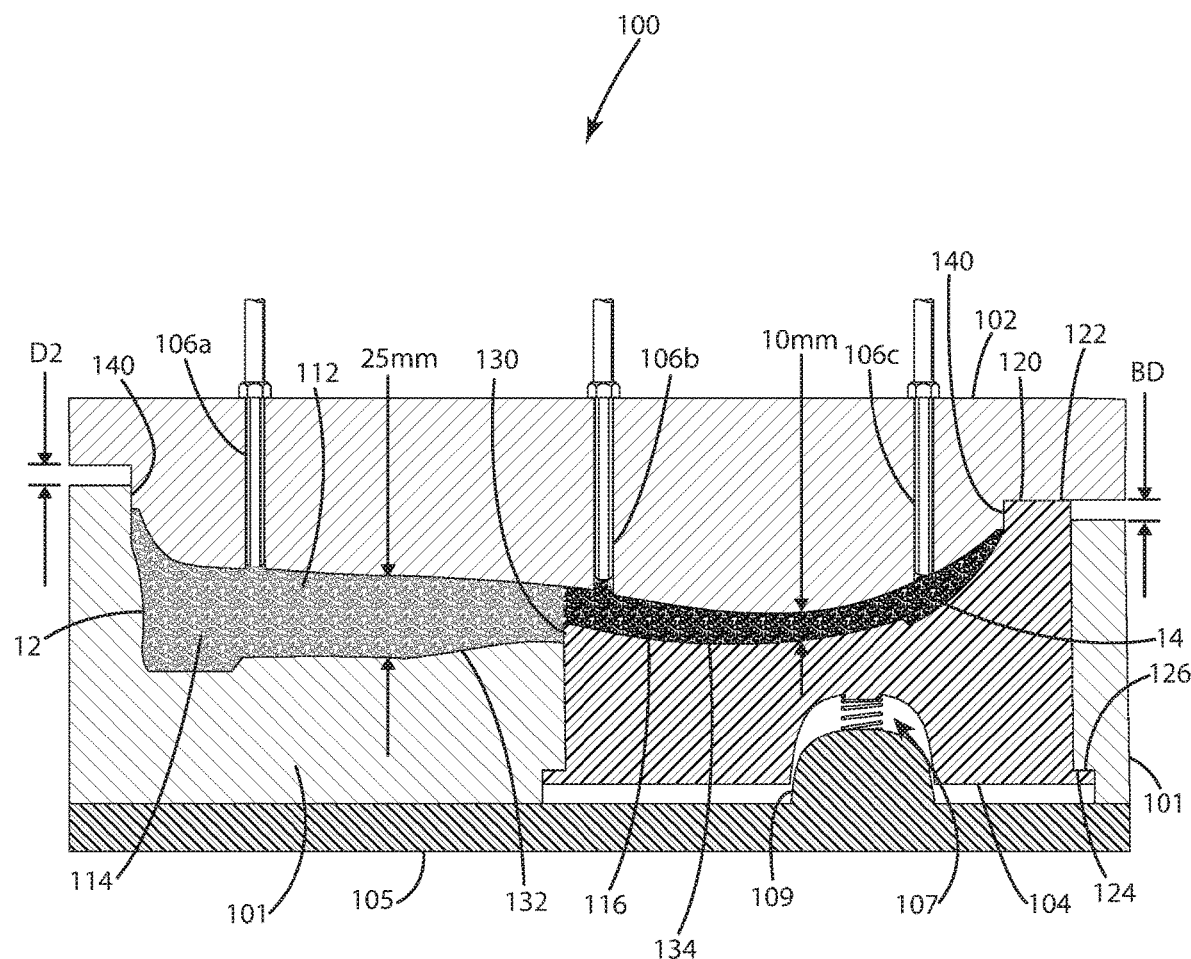
FIG. 3 shows a sectional view of the molding system of FIG. 2 in an intermediate position.

In the illustrated embodiment of FIG. 3, at the intermediate position and in displacing from the first distance D1 to the second distance D2, the volumes of the reference compression region 114 and the controlled compression region 116 are decreased. That is, the volume of the reference compression region 114, corresponding to the heel portion 12, has decreased from the first compression reference volume to a second compression reference volume. And the volume of the controlled compression region 116, corresponding to the forefoot portion 14, has decreased from the first compression controlled volume to a second compression controlled volume. Because the value of the first compression controlled volume is less than the first compression reference volume, but the displacement distance for both the controlled compression region 116 and the reference compression region 114 is the same, the percentage of compression for the controlled compression region 116 is greater than the reference compression region 114. This increase in relative compression results in a greater density of the foam beads for the controlled compression region 116 relative to the reference compression region 114 at the intermediate position. The difference in density can be seen in the spacing between the foam beads shown in the illustrated embodiment of FIG. 3 for the controlled compression region 116 and the reference compression region 114.

In the illustrated embodiment of FIG. 3, the top mold part 102, the bottom mold part 101, and the movable mold part 104 are disposed in the intermediate position and with the movable mold part 104 in the biased position. The top mold part 102 in the illustrated embodiment includes a top mold contact portion 120 configured to interface with a movable mold contact portion 122 at the intermediate position, as shown in the illustrated embodiment of FIG. 3. In displacement from the loading position in FIG. 2 to just prior to reaching the intermediate position in FIG. 3, the top mold contact portion 120 and the movable mold contact portion 122 are separated by a space.

Additional displacement from the intermediate position toward the joining position may involve movement of the movable mold part 104 from the biased position toward an unbiased position. As an example, the bias distance BD may decrease in response to additional displacement from the intermediate position to the joining position. More specifically, the bias distance BD may decrease from 5 mm at the intermediate position to 0 mm at the joining position.

In the illustrated embodiment of FIG. 3, movement from the biased position toward the unbiased position may result from the interface between the top mold contact portion 120 and the movable mold contact portion 122. Such movement and the interface may also relieve the mold stop between the movable mold part stop 124 and the bottom mold part stop 126.

Displacement of the movable mold part 104 from the biased position to the unbiased position in conjunction with displacement of the top mold part 102 from the intermediate position to the joining position may substantially avoid additional compression of the foam beads provided in the controlled compression region 116. This way, the foam beads disposed in the reference compression region 114 may continue to compress as the at least three mold parts move closer to the joining position, and the foam beads in the controlled compression region 116 may avoid additional compression resulting from movement toward the joining relative from the intermediate position. For the movable mold part 104 in transitioning from the intermediate position to the joining position, the bias element 107 may compress instead of the foam beads disposed in the controlled compression region 116, thereby mitigating against additional compression of the foam beads.

Figure 4:
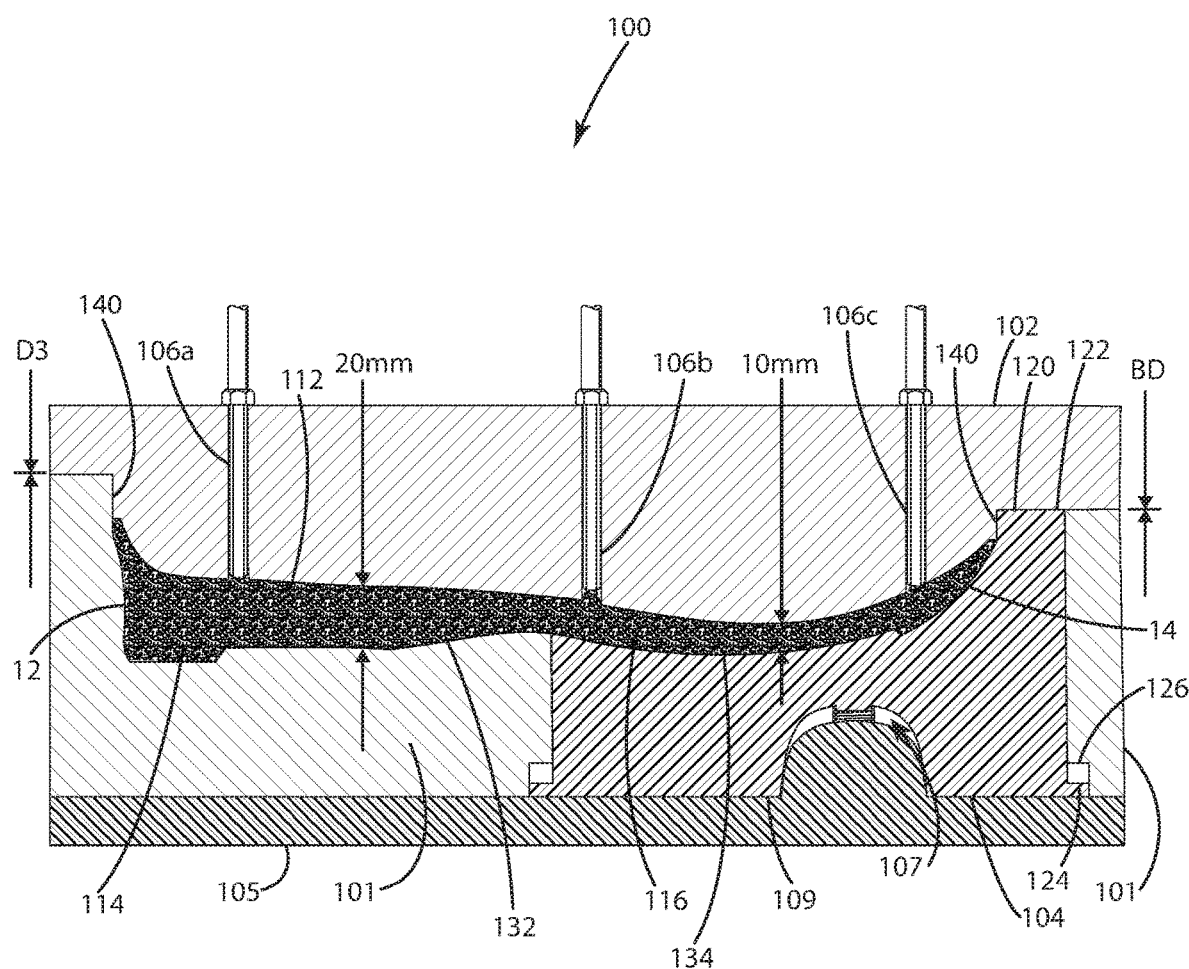
FIG. 4 shows a sectional view of the molding system of FIG. 2 in a joining position.

The illustrated embodiment of FIG. 4 depicts the at least three mold parts in the joining position, with the movable mold part 104 in the unbiased position. That is, the bias distance BD has been reduced substantially to zero or from a first bias distance to a second bias distance. And, in the joining position, the distance D is now at a third value D3, shown as 0 mm in the illustrated embodiment. Displacement from the intermediate position in FIG. 3 to the joining position in FIG. 4 may be achieved in a manner similar to that described in conjunction with displacement from the loading position to the intermediate position. For instance, an actuator may move the base 105 so that the distance D changes from the second value D2 at the intermediate position to the third value D3.

In the illustrated embodiment, at the joining position and in displacing from the second distance D2 to the third distance D3, the volume of the reference compression region 114 has decreased from the second compression reference volume to a third compression reference volume; however, with respect to the controlled compression region 116, because the movable mold part 104 transitioned from the bias position to the unbiased position, the volume of the controlled compression region 116 is substantially the same as it was when the molding system 100 was in the intermediate position—that is, in both the intermediate position and the joining position, the volume of the controlled compression region 116 is substantially the same despite additional compression of the reference compression region 114.

In the illustrated embodiment, the percentage of compression of the controlled compression region 116 and the reference compression region 114 is substantially the same such that, despite the offset or difference in thicknesses between the two regions, the percentage change in volume for both regions from the loading position to the joining position is substantially the same. As a result, the density of both regions may be substantially the same, despite the offset and despite displacement of the top mold part 102 and the bottom mold part 101 from distance D1 to distance D3 (zero) from the loading position to the joining position. This similarity in density can be seen in the spacing between the foam beads shown in the illustrated embodiment of FIG. 4 for the controlled compression region 116 and the reference compression region 114.

In the illustrated embodiments of FIGS. 2-4, the final thickness of the reference compression region 114 is 20 mm starting from a 30 mm thickness at the loading stage, and the final thickness of the controlled compression region 116 is 10 mm starting from a 15 mm thickness at the loading stage, due to the 5 mm bias distance. As a result, the percent compression of the reference compression region 114 is 33% and the percentage compression of the controlled compression region 116 is 33%. The bias distance to achieve substantially the same densities for these two regions can be calculated as follows: Bias Distance=(Forefoot Thickness+Mold Gap)/(((Forefoot Thickness*(Heel Thickness+Mold Gap))/Heel Thickness). In one embodiment, the sole component 10 may be molded with substantially uniform density in parts of the sole component 10 with different offset geometries by controlling effective mold gaps (e.g., with the bias distance) prior to pressing. This is in contrast to an embodiment without control of the effective mold gap in which the components formed of foam bead having different thicknesses in the direction of the steam chest mold press result in parts having non-homogenous densities.

It is noted that one or more embodiments of the present disclosure present disclosure are not limited to the controlled compression region 116 and the reference compression region 114 having the same density. Bias of the movable mold part 104 may be determined to yield a first density for the controlled compression region 116 and a second density, different from the first density, for the reference compression region 114. If the target densities are different, the bias distance, positive or negative, may be determined as a function of the target densities and the target thicknesses of the regions.

In the illustrated embodiment of FIG. 4, with the movable mold part 104 in the unbiased position, there is alignment between the bottom portion surface 132 and the movable mold surface 134. This alignment may yield a substantially continuous junction between the two surfaces or substantially no discontinuity 130 as shown in the illustrated embodiment. Alternatively, alignment may yield a discontinuous junction between the bottom portion surface 132 and the movable mold surface 134, such that the offset between the two surfaces from the loading position to the joining position decreases from a first value to a second non-zero value.

III. First Alternative Molding System

Figure 5:
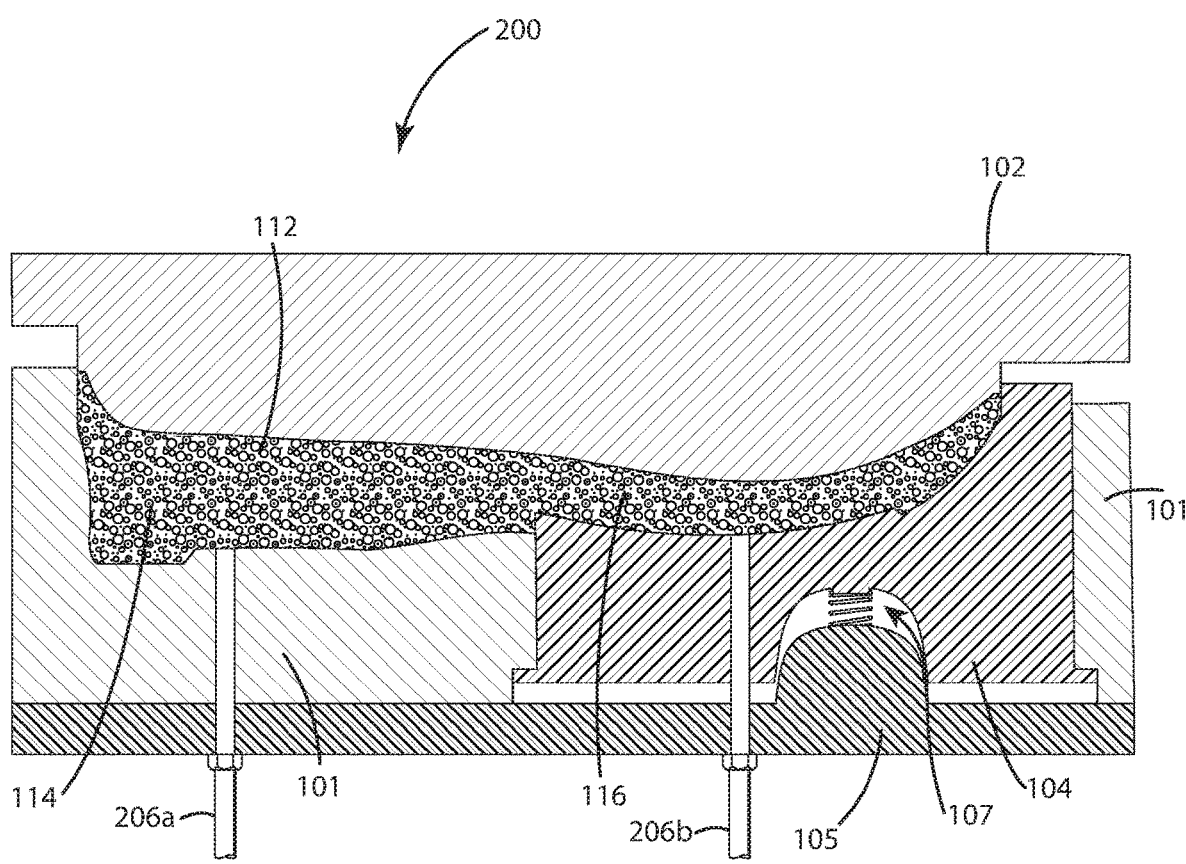
FIG. 5 shows a sectional view of a molding system in accordance with one embodiment in a loading position.
Figure 6:
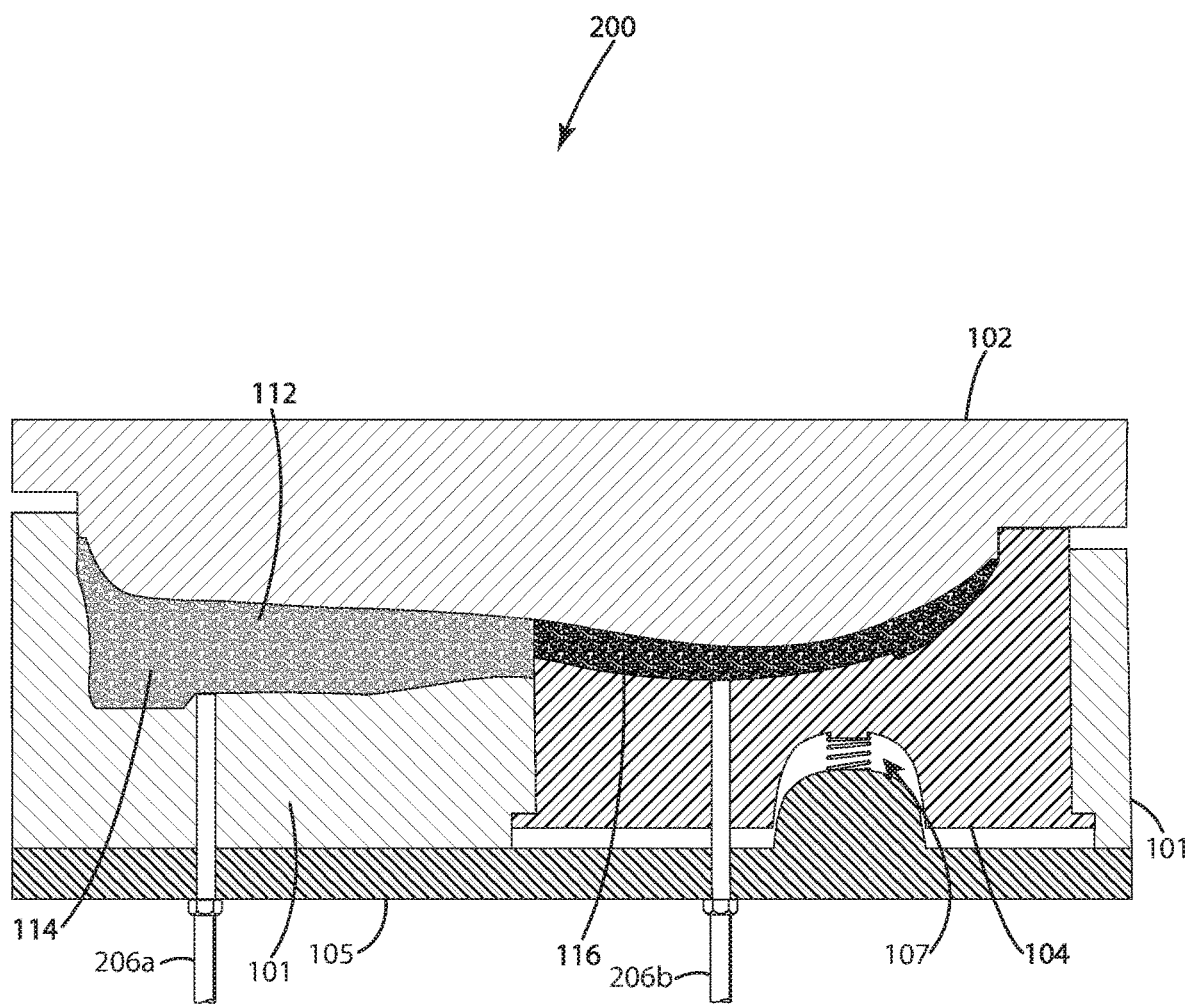
FIG. 6 shows a sectional view of the molding system of FIG. 5 in an intermediate position.
Figure 7:
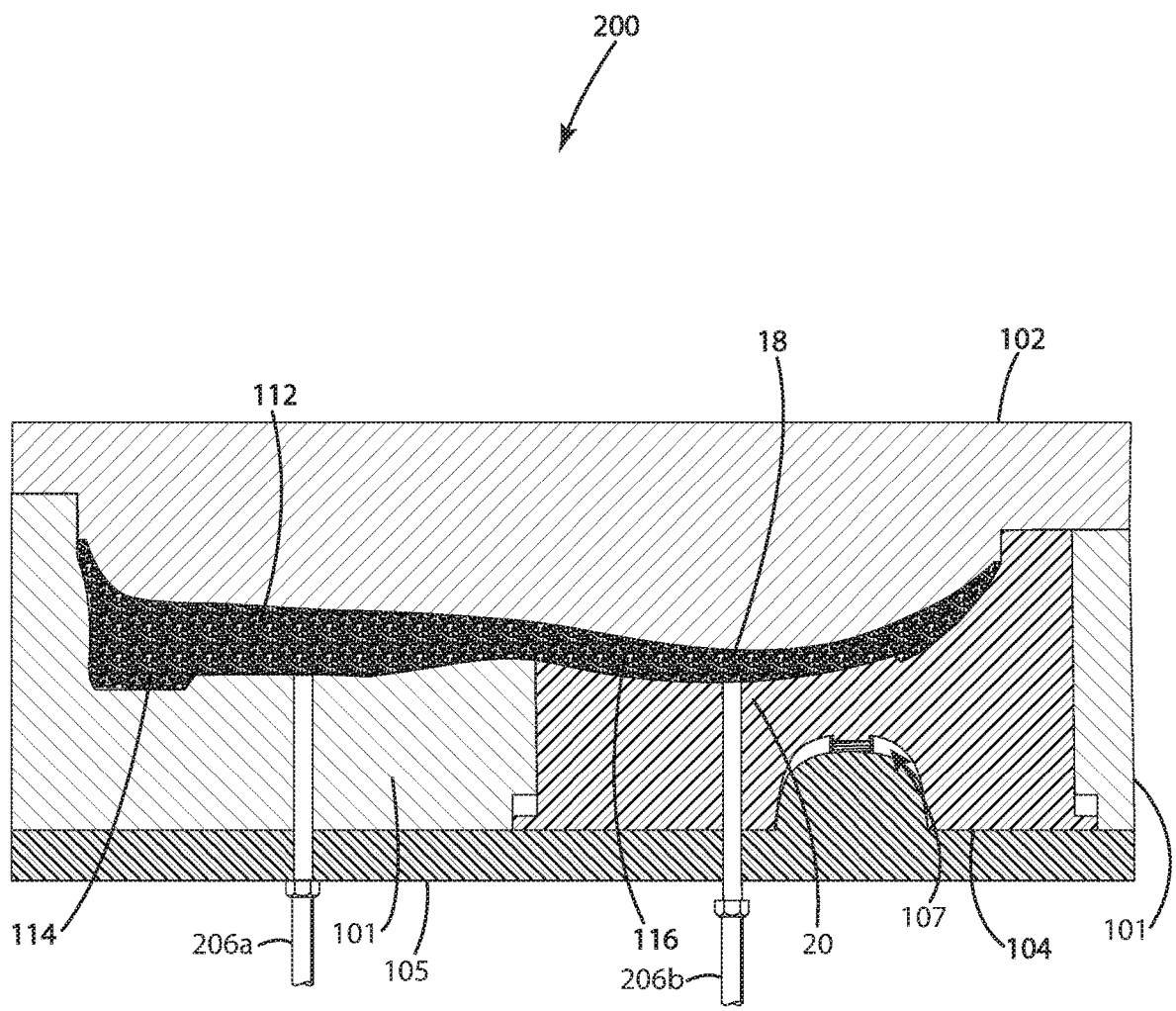
FIG. 7 shows a sectional view of the molding system of FIG. 5 in a joining position.
Figure 8A:
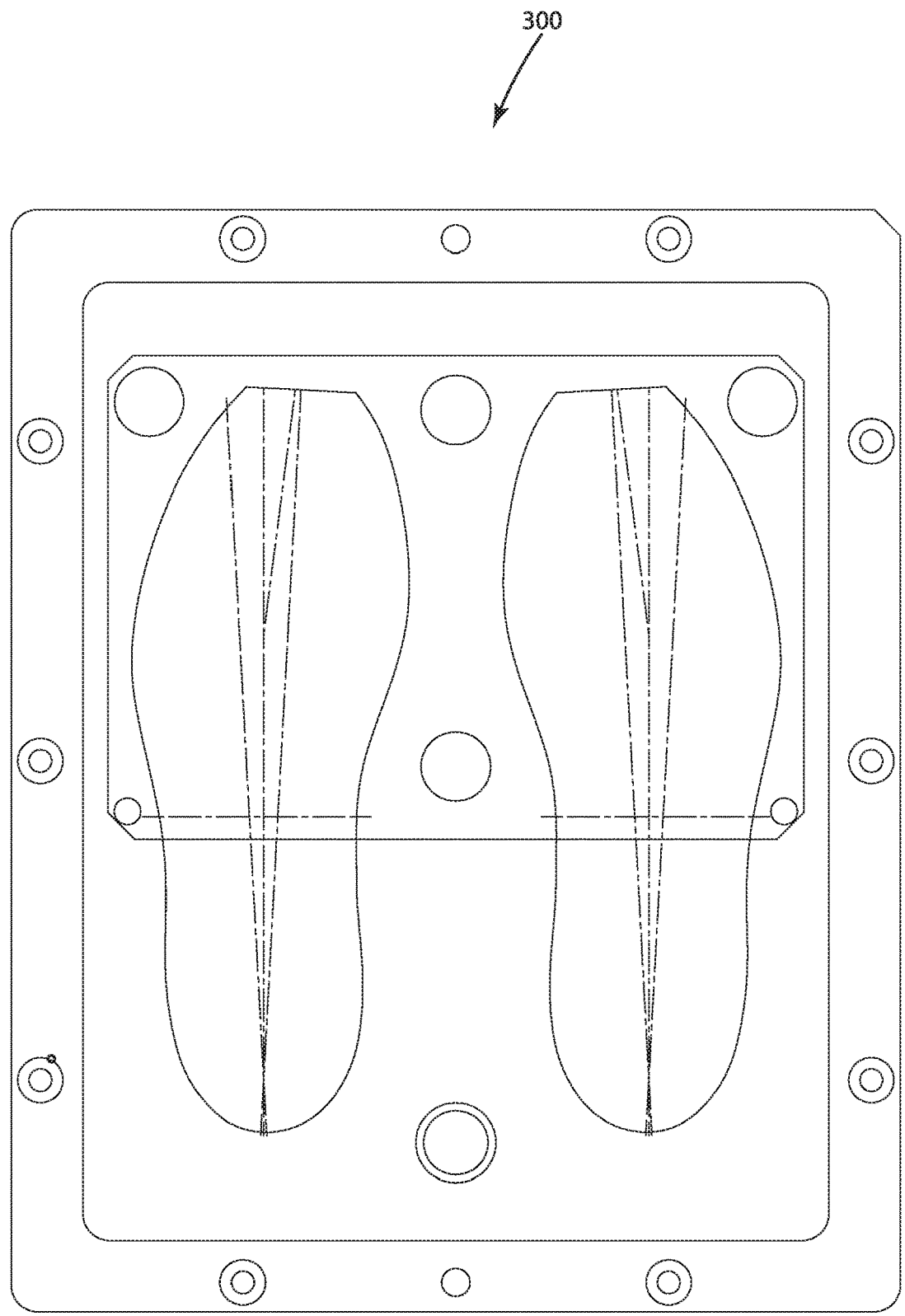
FIG. 8A shows a top view of a molding system in accordance with one embodiment.
Figure 8B:
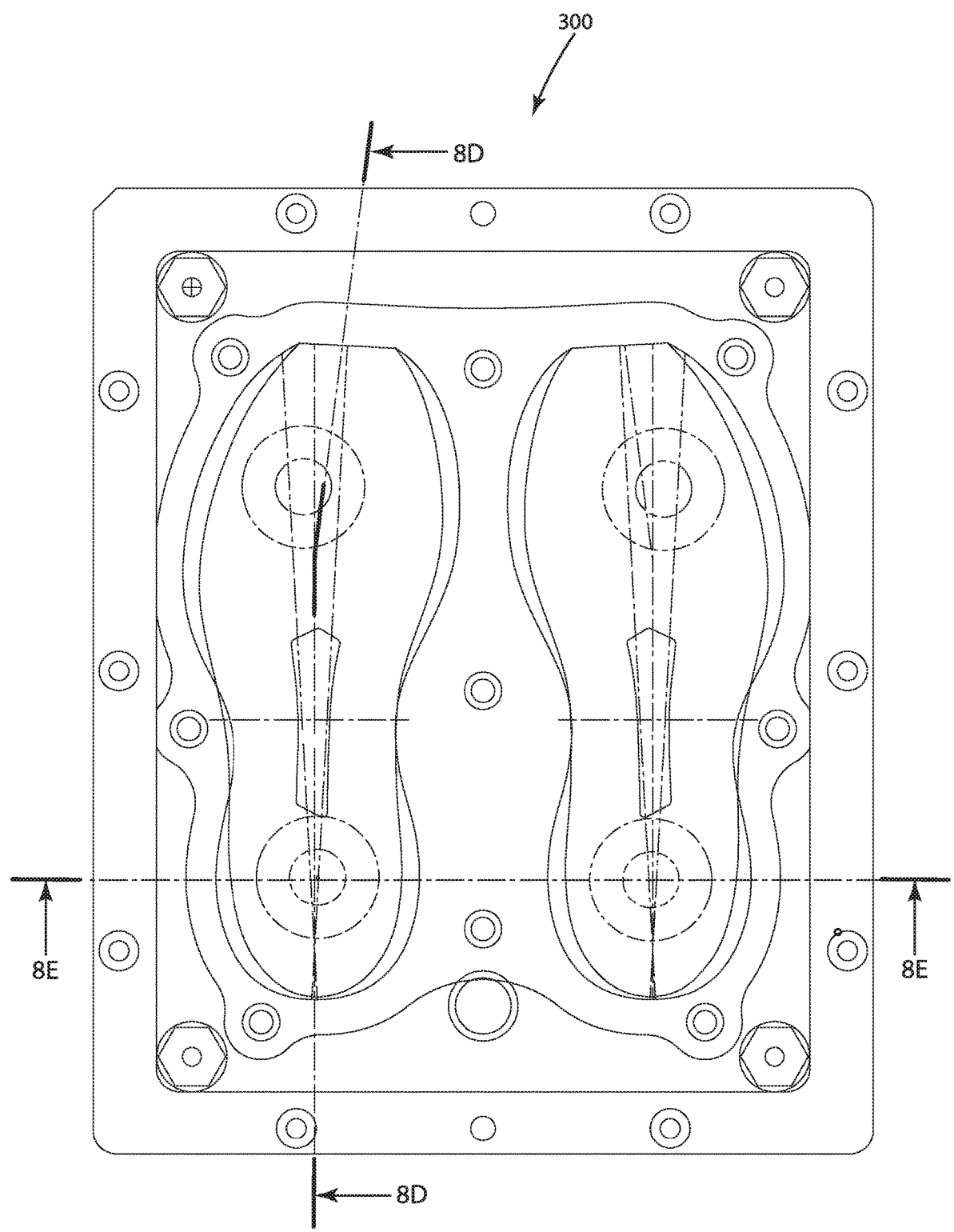
FIG. 8B shows a bottom view of the molding system in FIG. 8A.
Figure 8C:
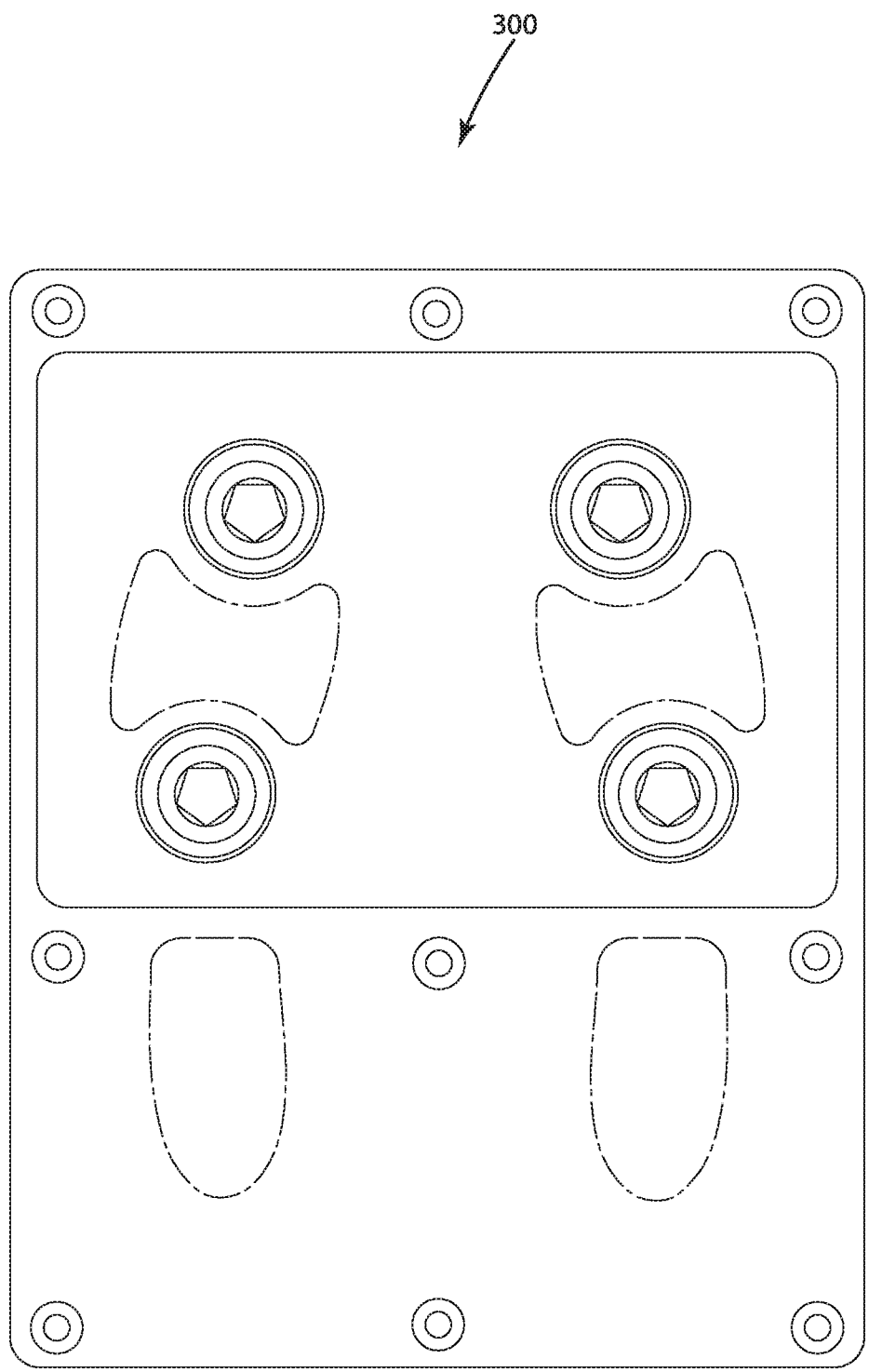
FIG. 8C shows a plate of the molding system in FIG. 8A.
Figure 8D:
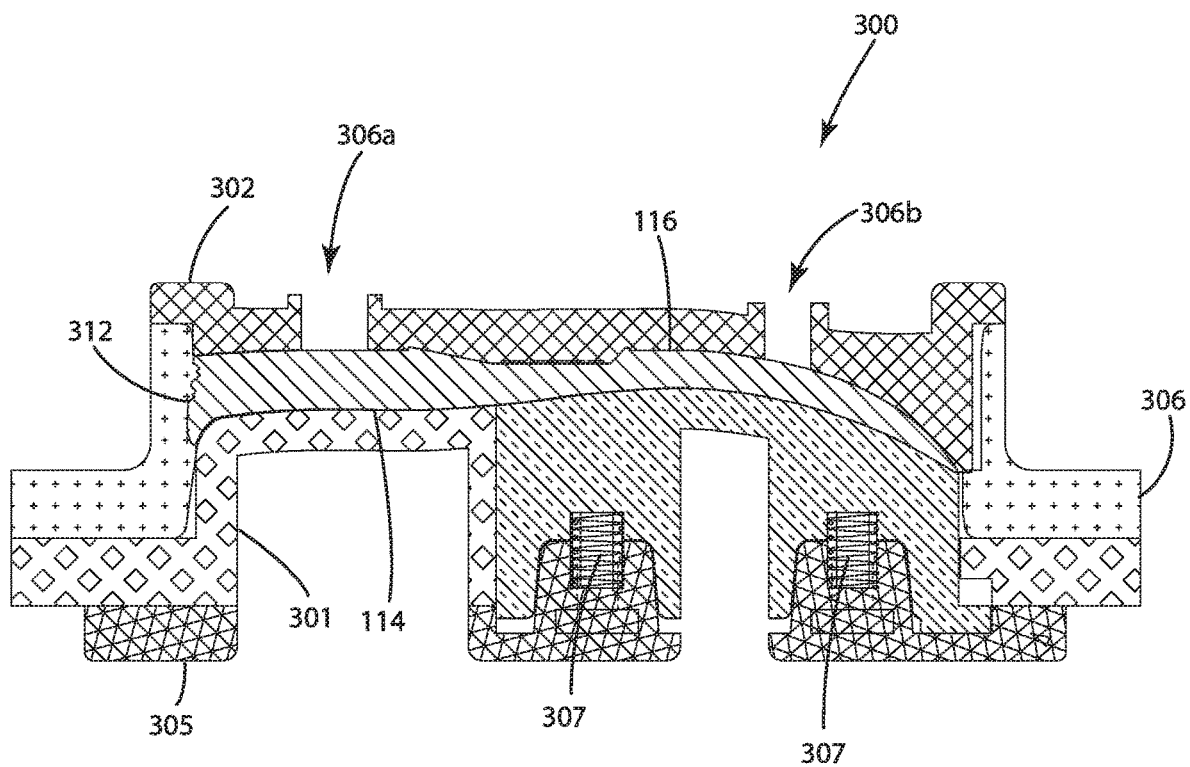
FIG. 8D shows a sectional view of the molding system of FIG. 8B.
Figure 8E:
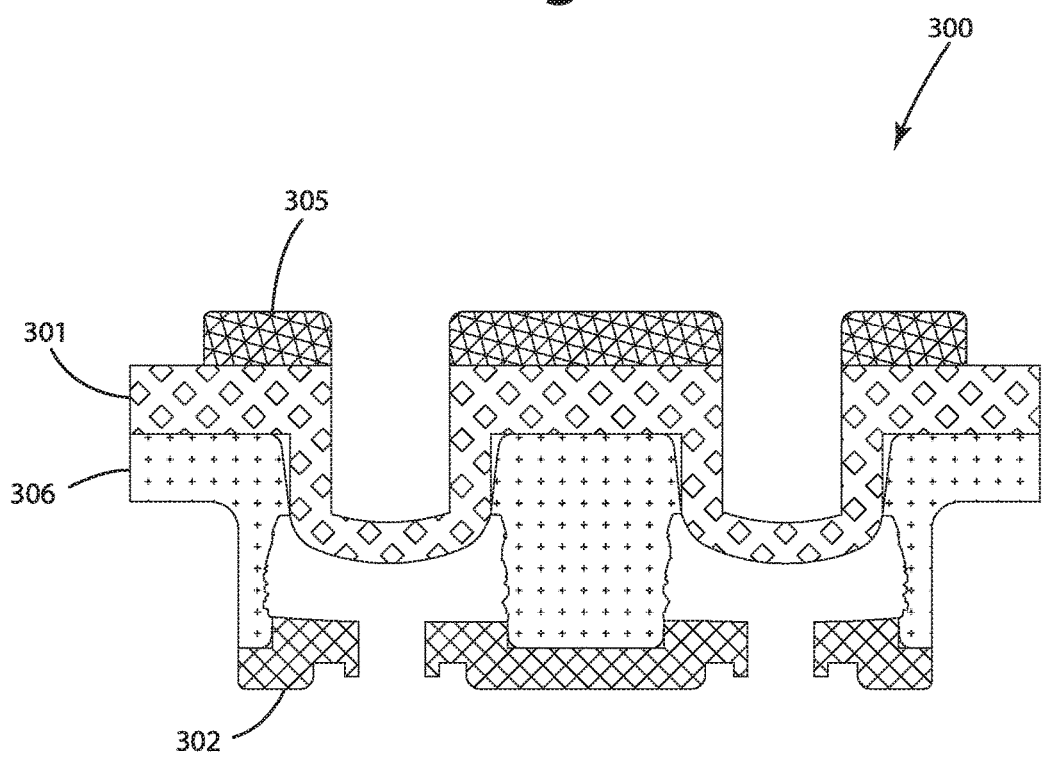
FIG. 8E shows a sectional view of the molding system of FIG. 8B.

An alternative embodiment of the molding system is shown in FIGS. 5-7 and generally designated 200. The molding system 200 is similar to the molding system 100 in many regards but with some exceptions Like the molding system 100, the molding system 200 may be configured to operate to produce a sole component 10 of foam beads according to a steam chest mold process. The molding system 200 may facilitate molding the sole component 10 with a reference compression region 114 and a controlled compression region 116. Components of the molding system 200 are provided with the same reference numbers where the components are constructed substantially similarly to the components of the molding system 100.

The molding system 200 in the illustrated embodiment includes one or more injectors 206a-b similar to the one or more injectors 106a-c but the one or more injectors 206a-b are provided in the bottom mold part 101 and the movable mold part 104 rather than the top mold part 102. In this configuration, the top mold part 102 may be operably coupled to an actuator, such as a hydraulic actuator, configured to move the top mold part 102 with the bottom mold part 101 and the base 105 supported in a stationary position. This movement of the top mold part 102 may result in displacement of the at least three molding parts 101, 102, 104, including displacement from the loading position to the intermediate position, and from the intermediate position to the joining position.

In the illustrated embodiment of FIGS. 5-7, the injector 206b is coupled to and movable with the movable mold part 104. For instance, as depicted in FIG. 7, the injector 206b is displaced relative to the base 105 and affixed to the movable mold part 104. A flexible coupling may be provided between a source of the foam beads and the injector 206b to facilitate such movement.

It is noted that in practice, the top mold part 102 in the molding system 200 is provided on the bottom of the molding system 200 and the bottom mold part 101, the movable mold part 104, and the base 105 are provided above the top mold part 102.

IV. Second Alternative Molding System

An alternative embodiment of the molding system is shown in FIGS. 8-11 and generally designated 300. The molding system 300 is similar in many respects to the molding system 100 described herein but with several exceptions. The molding system 300 may be configured to produce a sole component 10, or another component as described herein, of foam beads. The sole component 10 may include a reference compression region 114 and a controlled compression region 116. The molding system 300 includes at least three mold parts, including a bottom mold part 302, a top mold part 301, a base 305, a movable mold part 304. It is noted that the bottom mold part 302 is similar in some respects to the top mold part 102 in the molding system 100, and that the top mold part 301 is similar in some respects to the bottom mold part 101.

In the illustrated embodiments of FIGS. 8A-E, the molding system 300 is shown in the joining position with the movable mold part 304 aligned with the top mold part 301. Foam beads have already been provided to the molding cavity 312 via the injectors 306a-b, and the controlled compression region 116 of the sole component 10 has also avoided further compression associated with displacement of the top mold part 301 relative to the bottom mold part 302 with respect to the reference compression region 114.

The molding system 300 includes first and second bias elements 307 configured to bias the movable mold part 304 to a bias position. The first and second bias elements 307 in the illustrated embodiment are springs. Adjustment nuts operably coupled to each of the first and second bias elements 307 are capable of adjusting the pre-loading of the springs so that the amount of force applied (as well as compression resistance) to the movable mold part 304 can be adjusted.

Figure 9:
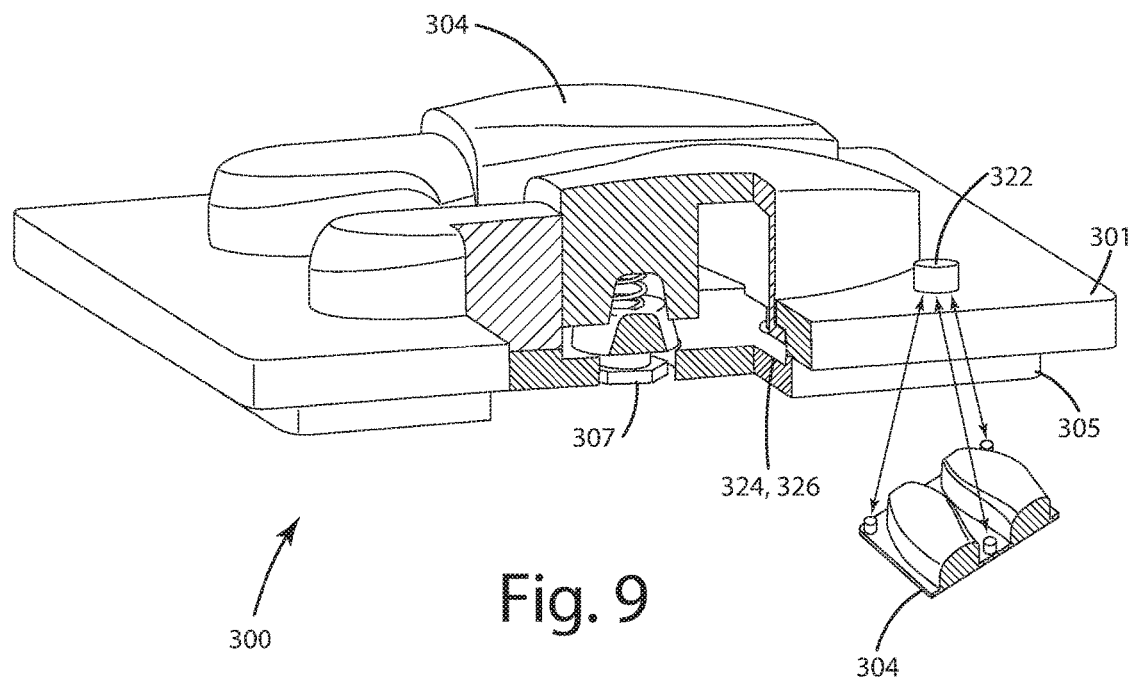
FIG. 9 shows a perspective view of the molding system of FIGS. 8A-E with cutouts and depicted without a top molding part.

FIG. 9 depicts the molding system 300 without the bottom mold part 302. As can be seen in the illustrated embodiment, the movable mold part 304 includes a movable mold contact portion 322 in the form of a pin that extends through an opening of the top mold part 301. In operation, with the molding system 300 in the intermediate position, the movable mold contact portion 322 contacts a bottom mold contact portion (not shown) to facilitate displacing the movable mold part 304 from the bias position to the unbiased position. The movable mold part 304 may be separable from the molding system 300 in one embodiment. For instance, the base 305 and the top mold part 301 may be fastened together in a manner that captures the movable mold part 304 but allows movement thereof in the molding process. Fasteners such as bolts and threaded apertures may be utilized to fasten the base 305 to the top mold part 301. The movable mold part 304 in the illustrated embodiment is a forefoot inner core element defining a contour of the sole component 10 that supports a foot.

The base 305 in the illustrated embodiment provides a support for the at least one bias element 307 to bias the movable mold part 304 into the bias position. As described herein, the at least one bias element 307 may be associated with an adjuster, such as a nut, that can adjust the spring force to dispose the movable mold part 304 into the bias position. In other words, the at least one bias element 307 in conjunction with the adjustor may displace (e.g., raise) the movable mold part 304 to the bias position, which in the illustrated embodiment, narrows the forefoot cavity of the mold cavity 112, the controlled compression region 316, thereby reducing the foam beads provided into the controlled compression region 316 to achieve a different density of the controlled compression region 316 than would otherwise occur without the bias. The force of the at least one bias element 307 may be adjusted to allow sufficient movement of the movable mold part 304 relative to the top mold part 301 and the base 305. In one embodiment, the force of the bias element 307 may be adjusted or a configuration of the bias element 307 may be selected, or a combination thereof, to achieve production parts with the same densities for the forefoot portion 14 and heel portion 12 when the molds are the same machine with the same mold gap (e.g., the same distance D). The bias element 307 may be adjusted size by size for production parts to achieve the same densities for the forefoot portion 14 and heel portion 12.

In the illustrated embodiment, the movable mold part 304 is disposed in the bias position, with the movable mold part stop 324 and top mold part stop 326 forming a movable mold stop maintain the movable mold in the bias position in conjunction with the first and second bias elements 307.

Figure 10:
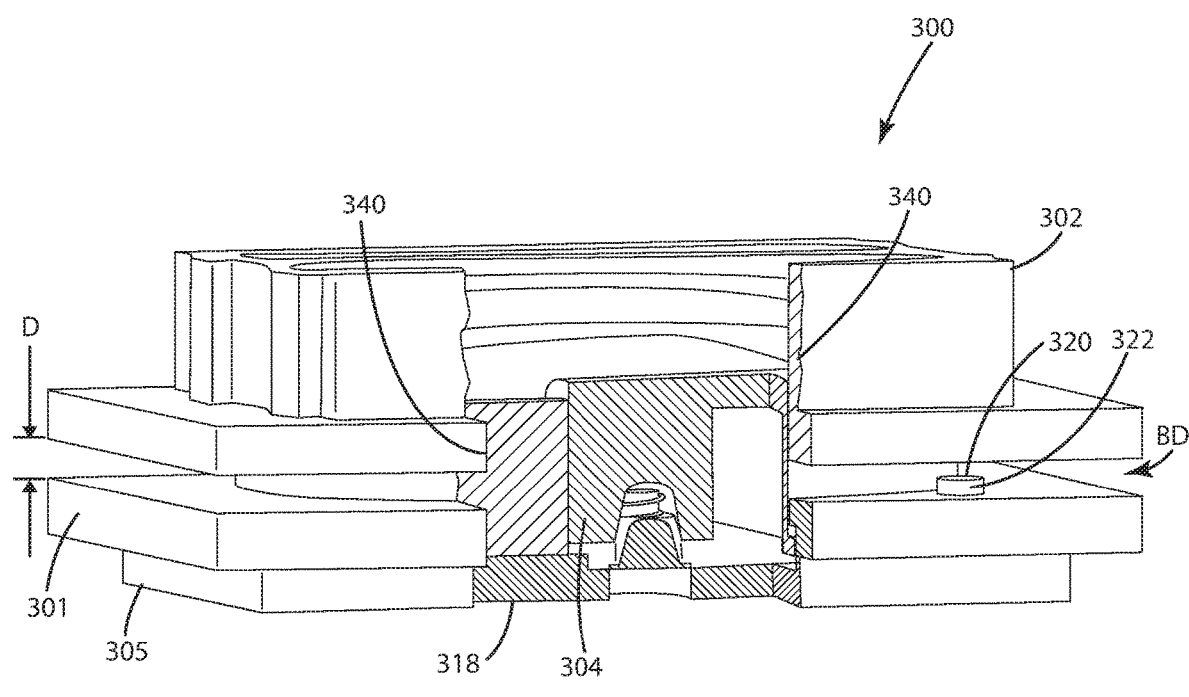
FIG. 10 shows a perspective view of the molding system of FIG. 8A-E with cutouts and depicted in a loading position.

Turning to FIG. 10, the molding system 300 of FIG. 9 is shown with the bottom mold part 302 disposed in a loading position with respect to the top mold part 301 and the movable mold part 304. The bias distance in the illustrated embodiment is 6 mm, but the bias distance may be different depending on the application and desired density of the controlled compression region 316. The bottom mold part 302 and top mold part 301 are spaced by a distance D, which can be selected in conjunction with the bias distance to control the density of the sole component 10 in the controlled compression region 316 and the reference compression region 314.

It is noted that the base 305 and top mold part 301 may be configured to provide head room so that the movable mold part 304 in the unbiased position does not contact the base 305. In FIG. 10, this headroom is designated 318 and is approximately 12 mm and greater than or equal to the bias distance BD.

Figure 11:
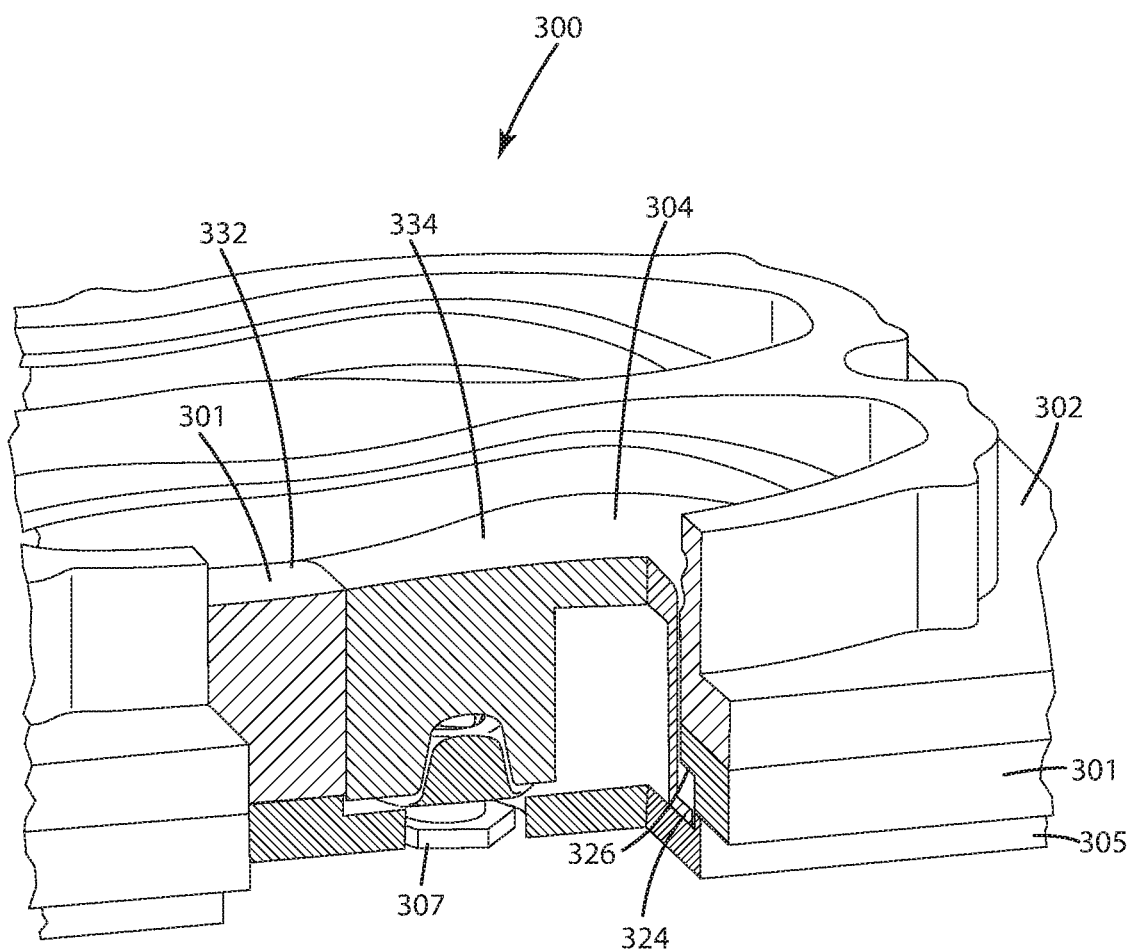
FIG. 11 shows a perspective view of the molding system of FIG. 8A-E with cutouts and depicted in a joining position.

The molding system 300 is shown in the joining position in the illustrated embodiment of FIG. 11. The bottom mold part 302, the top mold part 301, and the movable mold part 304 have been displaced such that the distance D is approximately zero, and the bias distance BD is approximately zero. The movable mold part stop 324, and the top mold part stop 326 are no longer in contact with each other, and the first and second bias elements 307 are compressed. A top portion surface 332 and a movable mold surface 334 have transitioned from a misaligned state in the loading position to an aligned state in the joining position.

Similar to the molding system 100, the molding system 300 in the illustrated embodiments provides a controlled compression region 316 that avoids additional compression relative to another region due to additional displacement of molding parts of the molding system 300. This way, despite differences in thickness, the sole component 10 may be produced with regions having selected densities, optionally substantially the same density. In the illustrated embodiment, the movable mold part 304 the controlled compression region 316 may be prevented additional compression relative to another region by displacement of the movable mold part 304 from its bias position.

As discussed herein, a sole component 10 may have differences in thickness in different portions of the part. In many shoes the differences in thickness between the midfoot and forefoot may be anywhere between 0 mm and 12 mm, and sometimes more. However, in an embodiment of steam chest molding with no movable mold part 304, the mold gap for the entire sole component 10 may be fixed even if the final part is shallower in the forefoot portion 14 than the heel portion 12. Thus, percentage-wise, the forefoot portion 14 may be compressed more than the heel portion 12. For example, in a final sole component 10 where the forefoot portion 14 is 15 mm thick, the heel portion 12 is 25 mm thick, and the mold gap or distance D is 10 mm, the forefoot portion 14 would be compressed by 10 mm/(10 mm+15 mm) or 40% and the heel would be compressed by 10 mm/(10 mm+25 mm) or 29%. This means the forefoot portion 14 is compressed more and has a higher density. In one embodiment of the present disclosure, the forefoot portion 14, or any other portions, of the sole component 10 may have a different density than would otherwise occur with no controlled compression region 316. For instance, the molding system 300 may be configured such that the forefoot portion 14 has substantially the same density as the heel portion 12.

In the illustrated embodiment, the molding system 300 includes a top mold component split into two parts, designated the top mold part 301 and the movable mold part 304. For purposes of disclosure, the movable mold part 304 is associated with the forefoot portion 14; however, the movable mold part 304 may be associated with additional or alternative portion portions of the sole component 10.

The movable mold part 304 may be biased with the first and second bias elements 307 (more or less bias elements may be used) to change the effective mold gap for the controlled compression region 316 associated with the movable mold part 304. This change in effective mold gap presents as the bias distance, which in the case of a positive bias distance reduces the effective mold gap for the controlled compression region 316. For example, the distance D minus the bias distance BD in the illustrated embodiment yields a positive bias.

It is noted that the illustrated embodiment, the first and second bias elements 307 are acting in compression with respect to displacement of the movable mold part 304 from the bias position to the unbiased position. Alternatively, one or more bias elements may act in extension in the mold gap in the thicker portion (increasing the mold gap in the heel). The force created by the stiffness of the compression/extension of the spring may be less than the pressure of the mold closing force. This way, the movable mold part 304 may move in response to closure of the molding system 300.

The molding system 300 is described primarily in conjunction with providing a controlled compression region 316 and a reference compression region 314 with similar or the same densities despite differences in the overall thicknesses of these regions. However, the present disclosure is not so limited. Bias of the movable mold part 304 may be selected to control the relative densities of the controlled compression region 316 and the reference compression region 314, such that they are different from each other. It should also be noted that there may be more than one controlled compression region 316, or more than one reference compression region 314 (relative to a controlled compression region 316), or a combination thereof.

For instance, in one embodiment, the molding system 300 may be configured to provide a medial post in the sole component 10 having a density greater than the surrounding structure of the sole component 10. The surrounding structure may include the forefoot portion 14 and the heel portion 12, and these regions other than the medial post may be molded with the molding system 300 to yield substantially similar densities, as described in conjunction with one or more embodiments herein. The medial post may be constructed with greater density by increasing the effective mold gap in the associated region—e.g., providing a negative bias for a movable mold part 304 such that the movable mold part allows a greater initial volume of foam beads in the associated region relative to the reference compression region 314. As the negative bias dissipates in response to closure of the molding system 300, the controlled compression region 316 associated with the negative bias for the movable mold part 304 and the medial post may result in greater density in this region.

By using a positive bias or negative bias, or a combination thereof, for regions of the sole component 10, any target density can be achieved for any region of the sole component 10 where such portion of the sole component 10 has a different thicknesses than other regions. For instance, a subset of regions of the sole component 10, including all regions, may be molded to have substantially the same density. As another example, a subset of regions of the sole component 10 may be molded to have different densities (e.g., greater or less density) within the same sole component 10.

In one embodiment, to achieve substantially the same density for the controlled compression region 316 and the reference compression region 314, in the context of the forefoot portion 14 and the heel portion 12, the positive bias distance may be calculated as a function of the following:

Bias Distance=(Forefoot Thickness+Mold Gap)/
(((Forefoot Thickness*(Heel Thickness+Mold Gap))/Heel Thickness)

It is noted that for yielding regions of different densities, such as discrete regions having different densities, the bias distance may be calculated differently but as a function of the Mold Gap (distance D), the compression percentages or densities, and the target thicknesses of the regions.

V. Third Alternative Molding System

Figure 12:
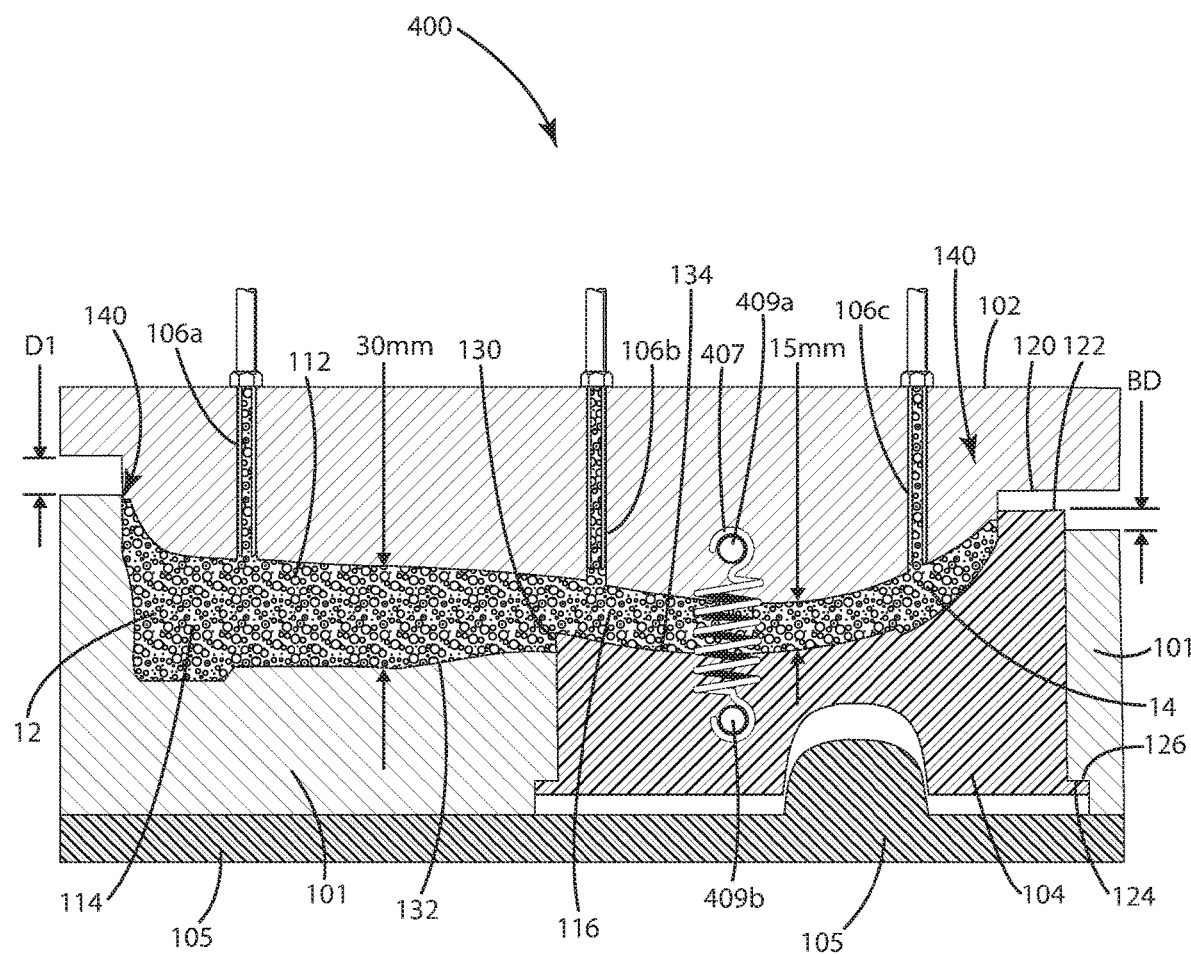
FIG. 12 shows a sectional view of a molding system in accordance with one embodiment in a loading position.
Figure 13:
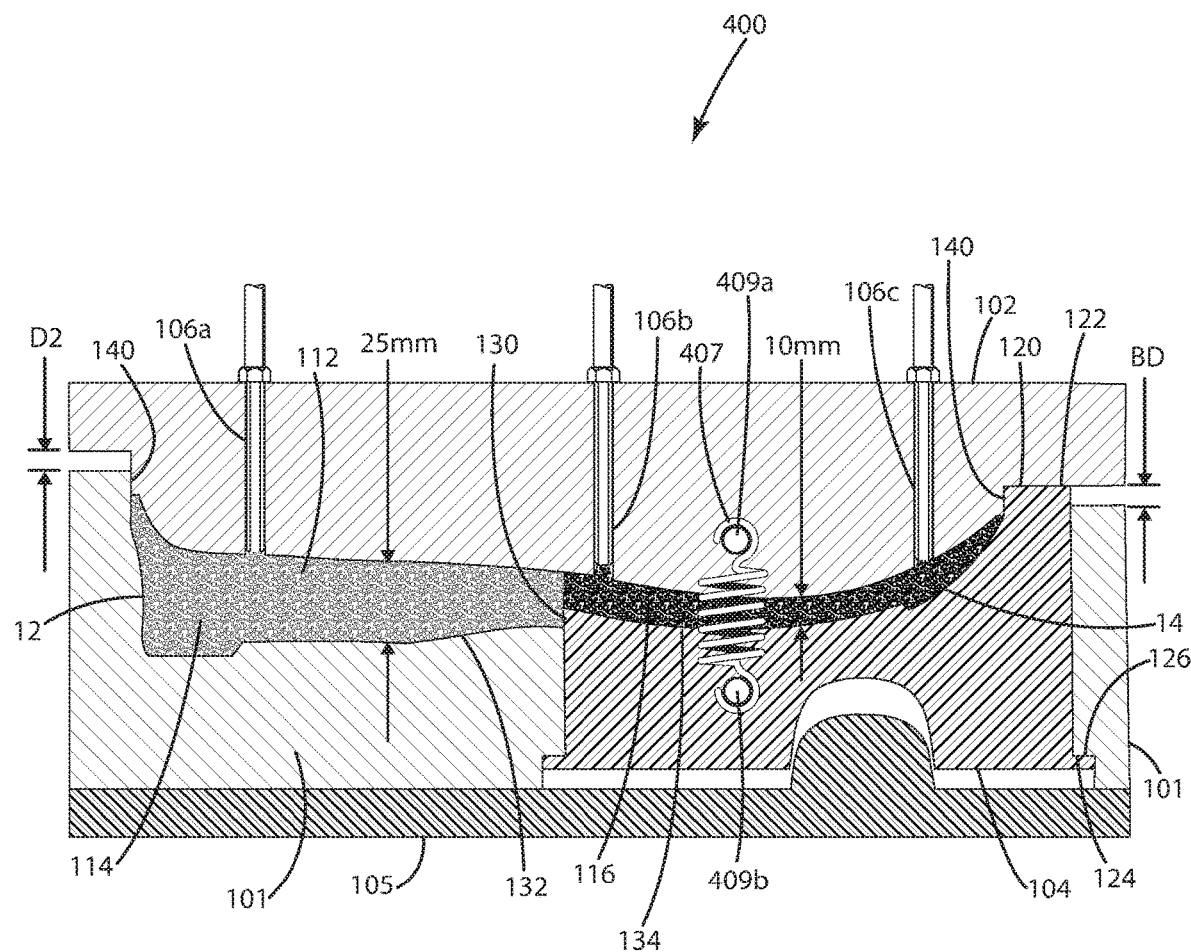
FIG. 13 shows a sectional view of the molding system of FIG. 12 in an intermediate position.
Figure 14:
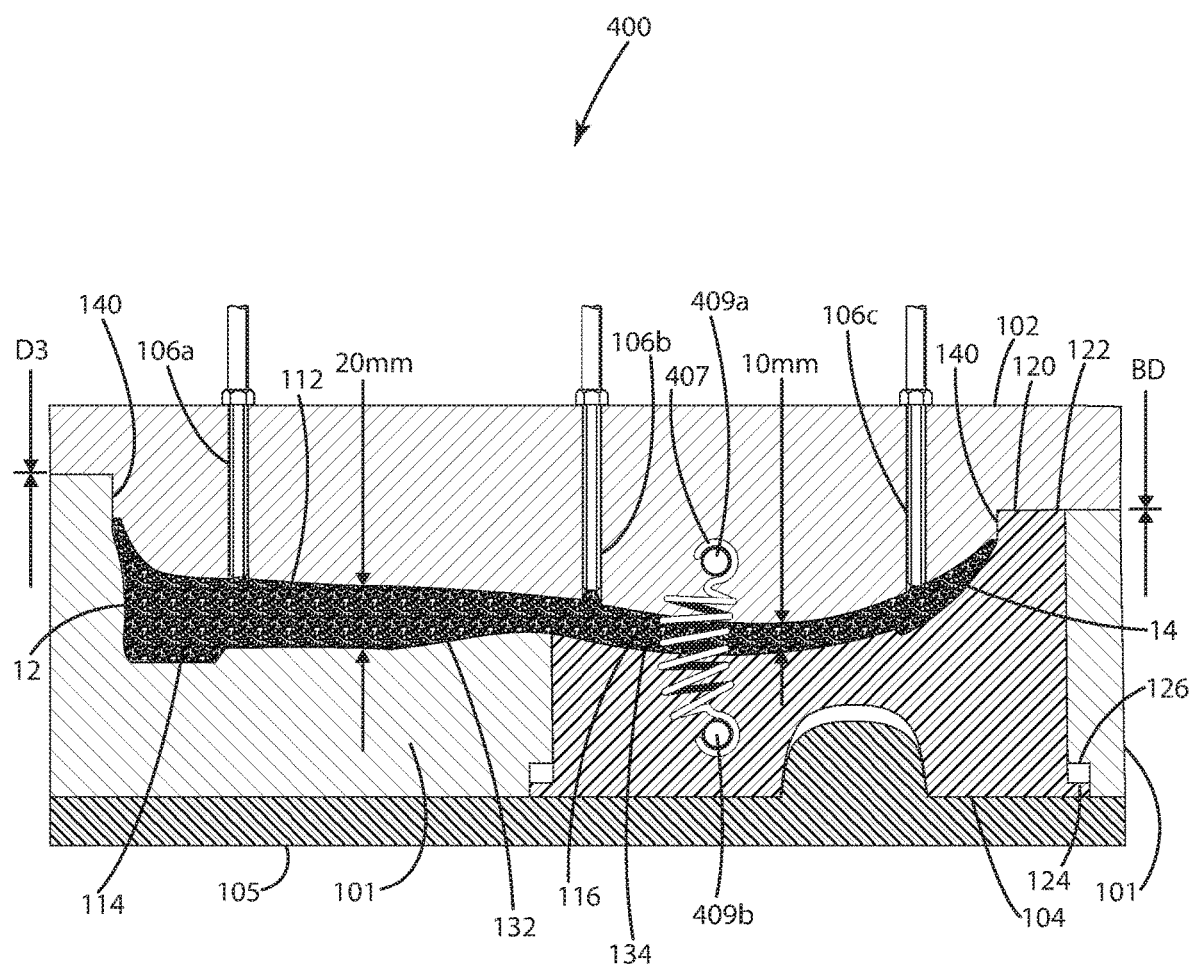
FIG. 14 shows a sectional view of the molding system of FIG. 12 in a joining position.

An alternative embodiment of the molding system is shown in FIGS. 12-14 and generally designated 400. The molding system 400 is similar to the molding system 100 in many regards but with some exceptions Like the molding system 100, the molding system 400 may be configured to operate to produce a sole component 10 of foam beads according to a steam chest mold process. The molding system 400 may facilitate molding the sole component 10 with a reference compression region 114 and a controlled compression region 116. Components of the molding system 400 are provided with the same reference numbers where the components are constructed substantially similarly to the components of the molding system 100.

The molding system 400 in the illustrated embodiment includes a bias element 407 configured operate in conjunction with first and second bias supports 409a-b to bias the movable mold part 104 to the bias position. The bias element 407 in the illustrated embodiment is a spring or spring-like element that, under tension, biases the movable mold part 104 to the bias position. The first and second bias supports 409a-b may be disposed respectively on the top mold part 102 and the movable mold part 104, and provide support for the bias element 407 in tension to bias the movable mold part 104 to the bias position. In the illustrated embodiment of FIG. 12, the bias element 407 is shown biasing the movable mold part 104 to the bias position, with the molding system 400 depicted in the loading position.

The top mold part 102, the bottom mold part 101, and the movable mold part 104 of the molding system 400 may be displaced to the intermediate position, similar to the intermediate position described in conjunction with the molding system 100. The illustrated embodiment of FIG. 13 depicts the molding system 400 in the intermediate position. The bias element 407 remains under tension in the illustrated embodiment at the intermediate position, thereby facilitating biasing the movable mold part 104 to the bias position.

As the top mold part 102, the bottom mold part 101, and the movable mold part 104 of the molding system 400 are displaced further from the intermediate position to the joining position (e.g., from distance D2 to distance D3), the top mold contact portion 120 and the movable mold contact portion 122 may interface to displace the movable mold part 104 from the bias position to the unbiased position. This interface and movement to distance D3 (e.g., zero) may relieve the tension on the bias element 407. In the illustrated embodiment of FIG. 14, with the movable mold part in the unbiased position and the mold system 400 in the joining position, the bias element 407 is slack such that substantially no tension exists in the bias element 407.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The invention claimed is:

1. A method of manufacturing a footwear sole, said method comprising:
providing a mold cavity defined at least by a first mold part, a second mold part, and a movable mold part;
positioning the first mold part opposite the second mold part at a loading position to define a first region of the mold cavity;
biasing the movable mold part to a bias position opposite the second mold part to define a second region of the mold cavity;
loading the mold cavity by introducing foam beads into the first and second regions of the mold cavity;
reducing a first region volume of the first region to a first value by disposing the second mold part and the first mold part to an intermediate position;
reducing a second region volume of the second region by disposing the second mold part and the movable mold part to the intermediate position;
automatically displacing the movable mold part relative to the first mold part in response to reducing the first region volume from the first value to a second value;
contacting the movable mold part with a contact portion of the second mold part at the intermediate position;
reducing the first region volume from the first value to the second value by re-positioning the second mold part and the first mold part in a joining position from the intermediate position;
maintaining the second region volume while reducing the first region volume to the second value by displacing the movable mold part relative to the first mold part, said maintaining including automatically displacing the movable mold part with the contact portion of the second mold part; and
providing a spring to bias the movable mold part to the bias position, wherein said automatically displacing the movable mold part with the contact portion of the second mold part includes compressing the spring.

2. The method of claim 1, wherein said automatically displacing the movable mold part includes maintaining the second region volume.

3. The method of claim 1, comprising:
providing a movable surface on the movable mold part and a first surface on the first mold part;
providing a second surface on the second mold part opposing the first surface and the movable surface, the first surface and the second surface defining the first region, the second surface and the movable surface defining the second region;
disposing, at the intermediate position, the first surface and the movable surface in a misaligned configuration; and
disposing, at the joining position, the first surface and the movable surface in an aligned position, whereby automatically moving the movable mold part moves the movable surface into alignment with the first surface.

4. The method of claim 1, comprising moving the movable mold part from the bias position to an unbiased position to maintain the second region volume.

5. The method of claim 1, wherein the foam beads include an expanded thermoplastic polyurethane.

6. A method for manufacturing a sole component for an article of footwear comprising:
providing a mold cavity defined at least by a first mold part, a second mold part, and a movable mold part;
positioning the first mold part opposite the second mold part at a loading position to define a first region of the mold cavity;
biasing the movable mold part to a bias position opposite the second mold part to define a second region of the mold cavity;
loading the mold cavity by introducing foam beads into the first and second regions of the mold cavity;
reducing a first region volume of the first region and reducing a second region volume of the second region by disposing the second mold part, the first mold part, and the movable mold part to an intermediate position;
further reducing the first region volume while maintaining the second region volume by automatically displacing the movable mold part relative to the first mold part;
positioning the first mold part, the second mold part, and the movable mold part in a joining position;
contacting the movable mold part with a contact portion of the second mold part at the intermediate position;
maintaining the second region volume while reducing the first region volume by displacing the movable mold part relative to the first mold part, said maintaining including automatically displacing the movable mold part with the contact portion of the second mold part; and
providing a spring to bias the movable mold part to the bias position, wherein said automatically displacing the movable mold part with the contact portion of the second mold part includes compressing the spring.

7. The method of claim 6, comprising joining the foam beads in the joining position to form the sole component.

8. The method of claim 7, comprising:
providing a first sole region of the sole component corresponding to the first region;
providing a second sole region of the sole component corresponding to the second region;
wherein a second region thickness of the second sole region is less than a first region thickness of the first sole region;
wherein a first region density of the first sole region is a function of a change in the first region volume and the first region thickness; and
wherein a second region density of the second sole region is a function of a change in the second region volume, the second region thickness, and displacement of the movable mold part relative to the first mold part.

9. The method of claim 8, wherein despite the first region thickness of the first sole region being greater than the second region thickness of the second sole region, the first region density and the second region density are substantially the same.

10. The method of claim 8, comprising:
providing a bias displacement corresponding to the displacement of the movable mold part relative to the first mold part, wherein the bias displacement is determined as a function of a selected value of the second region density;

engaging the movable mold part with the second mold part at the intermediate position; and moving the movable mold part with the second mold part into alignment with the first mold part to position the first mold part, the second mold part, and the movable mold part at the joining position.

* * * * *